United States Patent [19]

Ogaki et al.

[11] Patent Number: 5,337,846
[45] Date of Patent: Aug. 16, 1994

[54] DISASTER RELIEF ROBOT AND OPERATION CONTROLLER THEREFOR

[75] Inventors: Koji Ogaki, Yokohama; Tomoo Matsuda, Fujisawa; Kimihiko Takagi, Yamato; Takuya Sakamoto, Hiratsuka, all of Japan

[73] Assignee: Kabushiki Kaisha Komatsu Seisakusho, Tokyo, Japan

[21] Appl. No.: 983,583

[22] PCT Filed: Aug. 8, 1991

[86] PCT No.: PCT/JP91/01061

§ 371 Date: Feb. 4, 1993

§ 102(e) Date: Feb. 4, 1993

[87] PCT Pub. No.: WO92/02398

PCT Pub. Date: Feb. 20, 1992

[30] Foreign Application Priority Data

| Aug. 8, 1990 | [JP] | Japan | 2-210922 |
| Oct. 19, 1990 | [JP] | Japan | 2-280947 |
| May 27, 1991 | [JP] | Japan | 3-121296 |

[51] Int. Cl.⁵ ............................................. B62D 55/065
[52] U.S. Cl. ................................... 180/8.2; 180/7.1; 180/8.7; 180/9.32
[58] Field of Search ............ 180/7.1, 8.1, 8.2, 6.2, 180/6.7, 9.32, 9.46, 9.5, 10, 8.7

[56] References Cited

U.S. PATENT DOCUMENTS

| 3,730,287 | 5/1973 | Fletcher et al. | 180/8.2 |
| 4,977,971 | 12/1990 | Crane, III et al. | 180/9.32 |
| 5,174,405 | 12/1992 | Carra et al. | 180/9.5 |

FOREIGN PATENT DOCUMENTS

| 46-18171 | 5/1971 | Japan . | |
| 138071 | 10/1981 | Japan | 180/8.2 |
| 63-270 | 1/1988 | Japan . | |
| 203483 | 8/1988 | Japan | 180/7.1 |
| 63-203483 | 8/1988 | Japan . | |
| 203484 | 8/1988 | Japan | 180/7.1 |

*Primary Examiner*—Mitchell J. Hill
*Attorney, Agent, or Firm*—Richards, Medlock & Andrews

[57] ABSTRACT

A disaster relief robot can be prevented from falling over a precipice or the like while safety for the operator can be ensured during outdoor field transportation of relief supplies such as rescue apparatus and materials, medicines or food stuffs in the case of a wide-area disaster caused by an earthquake, a heavy rainfall, a landslide or the like. Accordingly, track frames (16) for crawlers (12) are pivotably attached to a robot body (10), respectively, at its front and rear ends, the distance L between the pivot shafts of the front and rear crawlers (12F, 12R) is set so that maximum pivoting loci (CF, CR) of the crawlers do not interfere with each other, and further, the gravitational center (G) of the robot body is set at a position intermediate of the distance (L) between the pivot shafts of the front and rear crawlers. Several kinds of operation controllers are also provided.

22 Claims, 15 Drawing Sheets

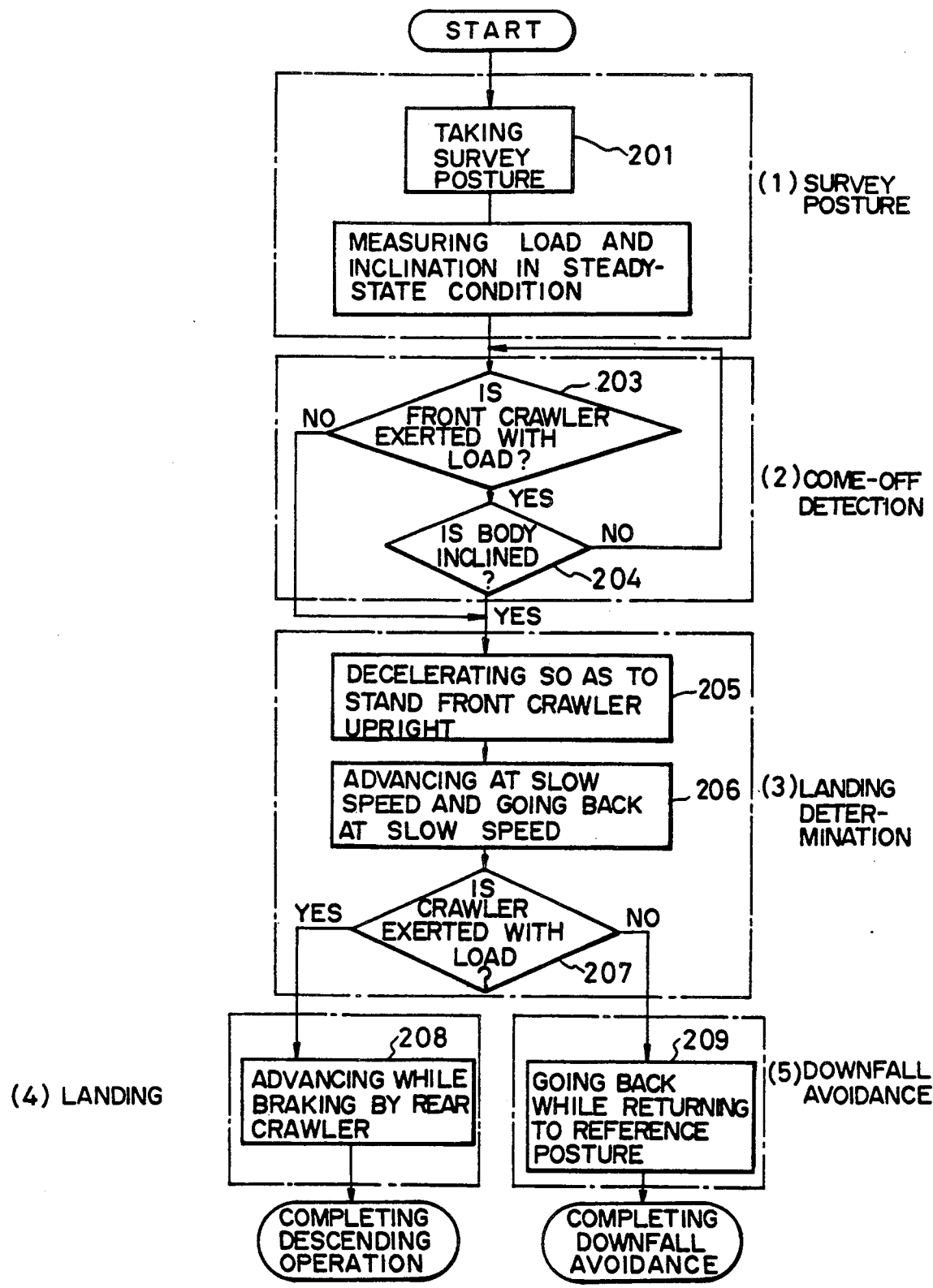

DISASTER RELIEF ROBOT AND OPERATION CONTROLLER THEREFOR

TECHNICAL FIELD

The present invention relates to a disaster relief robot which can prevent a downfall over a precipice or the like, and which can ensure the safety of an operator during field transportation of relief supplies such as relief apparatus and materials, medicines or food stuffs in the case of a wide-area disaster caused by an earthquake, a heavy rain, a landslide or the like, and also relates to an operation controller for the robot.

BACKGROUND

Heretofore, there has been provided a remote-controlled travelling robot which incorporates four travelling crawlers and which is used for disposal of dangerous substance in a nuclear power facility or on a flat land (refer to, for example, Japanese Patent Publication No. 63-270). As shown in FIG. 18, this robot is arranged such that crawlers 2, independent from each other, are provided at four corners of a robot body 1, that is, they are attached to the robot body 1 through the intermediary of pivot shafts 2a, respectively, so that they can be pivoted independently from each other. Accordingly, while the crawlers are positioned horizontally for normal travel, they can be made to stand upright for smooth movement in a narrow space and they can be inclined for overriding a bump.

However, in the case of outdoor use of the conventional robot on an off-road place or a place around a stricken area in a wide-area disaster, the robot is remote-controlled in its alert posture such that, in a cave-in area, the rear crawlers 2R are downwardly inclined to direct a stereo camera 3 mounted on the robot body 1 downwardly and forwardly, as shown in FIG. 19(a). The robot can be operated with a certain caution in indoor use since there is no obstacle disturbing the field of view of the camera 3, but, in the case of outdoor use around the stricken area, the field of view can be possibly disturbed by obstacles such as weeds so that the robot sometimes continues to advance even though the front crawlers 2F leave the ground as shown in FIG. 19(b). Should it continue to advance, the front crawlers 2F would become unsupported in their entirety so that the gravitational center of the robot body is shifted forwardly. In such a case, although the operator hurriedly instructs the robot to back up (as shown in FIG. 19(c)), the robot can fall into the cave-in depression since the gravitational center of the robot body is shifted towards the cave-in depression (as shown in FIG. 19(d)). Alternatively, as shown in FIG. 19(e), even though it is initially found that the robot body 1 is inclined forwardly, it cannot be readily determined whether this is caused by a concavity or convexity, or a cave-in depression. Accordingly, the advance of the robot is continued with monitoring. Even through an instruction to back up is issued due to the fact that an increase in inclination is found, the robot can slip (as shown in FIG. 19(f)) and then fall into the cave-in depression since the gravitational center of the robot body is shifted towards the front crawlers 2F (as shown in FIG. 19(d)). In particular, a large gripping force cannot be obtained if it travels on a muddy, sandy or weedy place, and accordingly, the robot tends to slip.

Further, in the case of climbing a bump, the robot normally travels until the front crawlers 2F come into contact with the bump as shown in FIG. 20(a). Then, the robot further advances while the front crawlers 2F are pivoted upwardly and elevated (as shown in FIG. 20(b), and thereafter, the front and rear crawlers 2F, 2R are pivoted downwardly in order to raise the robot body 1 (as shown in FIG. 20(c)) so that the robot advances to bring the rear crawlers 2R into as close contact with the surface of the bump as it possibly can (refer to FIG. 20(d)). However, if the rear crawlers 2R are forced to climb the bump in such a condition that the rear crawlers 2R make contact with an inclined surface of the bump (as shown in FIG. 20(e)), then when the rear crawlers 2R are pivoted upwardly and elevated, the gravitational center of the robot body 1 would be shifted rearwardly and the robot may fall off the bump (refer to FIG. 20(f)) since the gravitational center of the robot body is not always stable on the bump.

The conventional travelling robot is likely to have a risk of a downfall as mentioned above in a natural environment in which a cave-in depression or a bump is present as in a stricken area in a wide-area disaster, and accordingly, their actual activities have to be greatly limited. Further, upon occurrence of a downfall accident, a power transmission system, a structural member or the like can be damaged, and accordingly, there is raised a problem of impossible use of the travelling robot.

Such a remote-control of the robot is carried out by the operator who manipulates four knobs laid on the flat board of a control, for respectively controlling the postures of the crawlers. The rotating angles of the respective knobs exhibit the pivoting angles of the four crawlers, respectively.

However, should a robot having a three-dimensional shape be remote-controlled by means of the knobs laid in a planar configuration, the operator should carry out the posture control for every crawler while visualizing its posture in motion. In particular, such an imaginal control cannot at once cope with an instant delay in operation and an error in operation in the case of the operation of the robot in an off-road place such as a stricken area. Further, a deviation can occur between the actual pivot angle of each of the crawlers and the rotating angle of the associated knob. Moreover, the operator cannot finely and timely remote-control the robot since data, such as that each of the rollers comes to a stop before fulfilling a pivot-angle instruction due to a pivoting resistance, is not fed back to the knob. That is, the operator cannot remote-control the robot by directly feeling in his body the posture of each of the crawlers, and accordingly, a problem arises in that the robot can experience a downfall or a sidewise turn-over during its operation.

Further, in the case of travel on such an off-road place, the operator has to remote-control the robot while monitoring an inclinometer or the like, always paying the closest attention thereto in order to prevent the robot from falling off a precipice. That is, whether the robot falls down or not is dependent upon the operator's monitoring abilities and manipulation skills, and accordingly, the operator is greatly strained. Further, care should be taken to prevent the operator from falling down, in addition to taking care for the safe operation of the robot. Accordingly, if the operator has to remote control the robot over a long distance in an stricken area in a wide area disaster while he accompanies the robot, he can become greatly exhausted, and accordingly, there is a fear that he may have an accident such as a downfall over a precipice, and further, his monitoring abilities and manipulation skills deteriorate, resulting in a problem of erroneously causing the robot to fall down.

SUMMARY OF THE INVENTION

The present invention is devised in view of the above-mentioned problems, and accordingly, one object of the present invention is to provide a disaster relief robot which can travel on an off-road place stricken by a wide area disaster with no hindrance in running over a cave-in depression or a bump, and in which a drive system is not damaged even by a shock in a downfall or the like, and further to provide a maneuver control device for a disaster relief robot, with which the robot can be remote-controlled with a high responsiveness while the posture of each of the crawlers is grasped with direct feeling, and further, which can surely prevent occurrence of a downfall without requiring the operator's monitoring ability or the like so that safety can be ensured without causing great stress to the operator.

A disaster relief robot according to the present invention comprises a pair of left and right crawlers provided on each of the front and rear ends of a robot body, the crawlers each having sprockets which are driven and controlled independently of each other so as to run the robot, wherein a track frame of each crawler is pivotably attached to the robot body through the intermediary of a pivot shaft with the inter shaft distance between the pivot shafts of the front and rear crawlers being set so that their maximum pivoting loci do not interfere with each other, and the gravitational center of the robot body being set at a position intermediate of the inter shaft distance of the front and rear crawlers.

Further, a torque limiter is arranged in a pivoting power transmission system in each track frame of the crawler so that the torque transmission can be cut off when a pivot reaction force transmitted from the track frame side exceeds a predetermined value. Further, a sensor for detecting a pivot angle can be attached to the pivoting power transmission system between the torque limiter and the track frame.

With this arrangement, a maximum extended condition in which the distal ends of the pivoted front and rear crawlers are positioned away from the robot body and a minimum condition in which the distal ends are in close proximity to each other can be taken. Accordingly, upon running over a cave-in depression or a bump, only the front crawlers are extended forwardly, and accordingly, it is reversed so as to be moved backwardly when the front crawlers depart from an inclined surface of a cave-in depression, thereby it is possible to prevent the robot from falling. Further, in the case of climbing up a bump, the rear crawlers are inclined downwardly so as to raise and move the robot body after the front crawlers have been moved onto the top part of the bump in order to shift the gravitational center of the robot body toward the other side of the top part of the bump, and then the rear crawlers are further pivoted so as to return the robot body to its original posture, thereby it is possible to climb the bump. Further, with the provision of the torque limiter, a bumping force exerted on the crawlers to be pivoted does not directly affect the power source, and accordingly, a motor and a power transmission having a high gear ratio can be protected even though an external force in a pivoting direction is forcibly exerted by a bumping force upon a downfall. Further, the provision of the angle sensor for detecting a pivot angle, an actual pivot angle can be measured even through a deviation occurs in correspondence between the drive side pivot angle and the track frame side pivot angle, and accordingly, the operation control can be continued even though the pivot angle of the track frame unexpectedly varies due to a downfall or the like.

Further, an operation controller for a disaster relief robot, according to the present invention, incorporates four rotating angle detectors and knobs for controlling the postures of the track frames of the crawlers within a controller, the four knobs being arranged in a three-dimensional configuration similar to the track frames of the crawlers, a pivoting motor in each of the crawler track frames being controlled by a control circuit which receives rotating angle signals as desired pivot angle signals from the four rotating angle sensors and which computes and delivers differences between the desired pivot angle signals and feedback signals delivered from pivot angle detectors each incorporated in the pivoting motors. The four rotating angle detectors incorporated in the controller are driven respectively by motors which are associated therewith, and these four motors can be bilaterally controlled by a control circuit which receives pivot angle signals as desired rotating angle signals delivered from the pivot angle detectors and which computes and delivers differences between the pivot angle signals and feed-back signals from the four rotating angle detectors.

With this arrangement, the operator can directly feel the postures of the four track frames from the rotating angles of the knobs, and further, the operator can feel in his body the pivoting resistance, thereby it is possible to enhance the responsiveness in the remote control.

In addition, the operation controller for a disaster relief robot, according to the present invention, comprises crawler track frames arranged pivotably in the longitudinal direction of a robot body by means of pivot shafts so that crawlers on the front and rear ends of the robot body do not interfere with each other, and comprises an inclination detecting means for detecting a forward inclination of the robot body, and load detecting means for detecting loads exerted respectively on the left and right front crawlers, and a drive control means for driving and controlling sprockets and the pivot shafts in order to prevent the robot body from falling down if the inclination detecting means detects that the robot body is inclined forwardly in excess of a predetermined angle, or if the load detecting means detects that a load exerted on at least one of the left and right crawlers becomes less than a predetermined value. With this arrangement, the degree of pivoting freedom of each crawler frame is as large as 360 deg., and accordingly, an arbitrary pivoting posture can be taken. Thus, during travelling in a cave-in zone where a precipice or the like is present, a pivoting posture wherein the front crawlers are extended forwardly can be taken, thereby it is possible to easily take a posture in which the robot body can avoid falling down. Even through the front crawlers alone do not contact an inclined surface of the precipice or the like, it does not readily fall down since the gravitational center of the robot body is present in back of the inclined surface.

Further, in the case wherein a value detected by the inclination detecting means exceeds a predetermined value, or a value detected by each of the load detecting means becomes less than a predetermined value, the risk the robot may fall down is automatically and precisely determined. That is, the presence of a risk of occurrence of a downfall can be automatically and precisely determined, independent of the operator's monitoring.

When the above-mentioned determination is made, the pivot shafts and the sprockets are driven and controlled so as to automatically take a pivoting posture which prevents the robot body from falling down, and travelling control is carried out. That is, it is possible to automatically and surely avoid falling down, independent of the operator's manipulation ability. For example, when the front crawlers are pivoted from the front end towards the rear end of the robot body by way of the upper side thereof so as to return the posture of the robot into its reference posture in which the front and rear crawlers are in proximity to each other, the front crawlers can be returned to a position in back of the inclined surface, and simultaneously, the robot is moved backwardly so as to be returned to its condition before the downfall.

BRIEF DESCRIPTION OF THE DRAWINGS

FIG. 16 is a flow-chart for explaining a third embodiment of the operation controller according to the present invention;

Figure 20A:
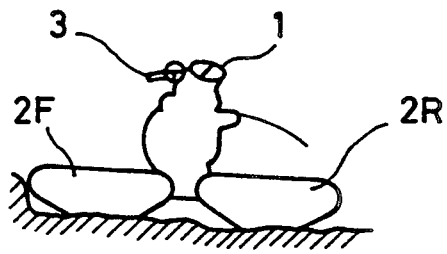
FIGS. 20(a)-20(f) are views illustrating a bank overriding operation of the conventional travelling robot, with FIG. 20(a) illustrating the forwardly moving robot abutting against a bump, FIG. 20(b) illustrating the pivoting ascent of the front crawlers while the robot moves up the bump, FIG. 20(c) illustrating the pivoting of the rear crawlers to raise the robot body, FIG. 20(d)
Figure 20D:
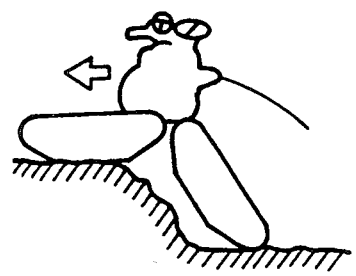
Figure 20B:
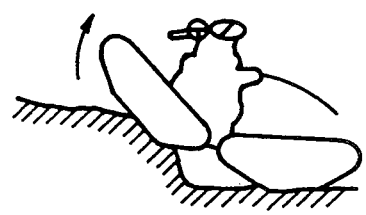
Figure 20E:
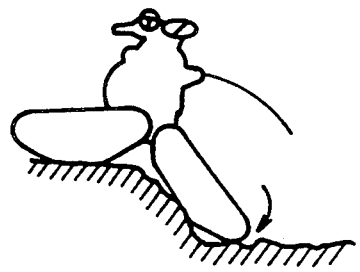
Figure 20C:
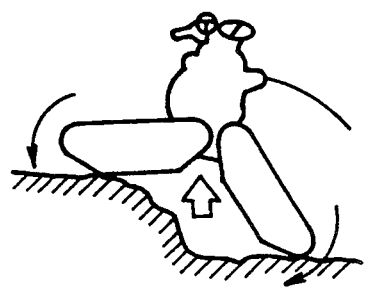
Figure 20F:
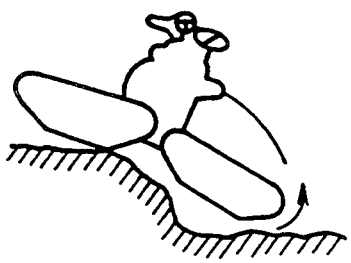

illustrating the advance of the raised robot over the bump, FIG. 20(e) illustrating the rear crawlers making close contact with the inclined surface of the bump, and FIG. 20(f) illustrating a rearward downfall of the robot.

BEST MODE FOR CARRYING OUT THE INVENTION

Detailed explanation will be hereinbelow made of a disaster relief robot and specific embodiments of an operation controller therefor, according to the present invention, with reference to the drawings.

Figure 1:
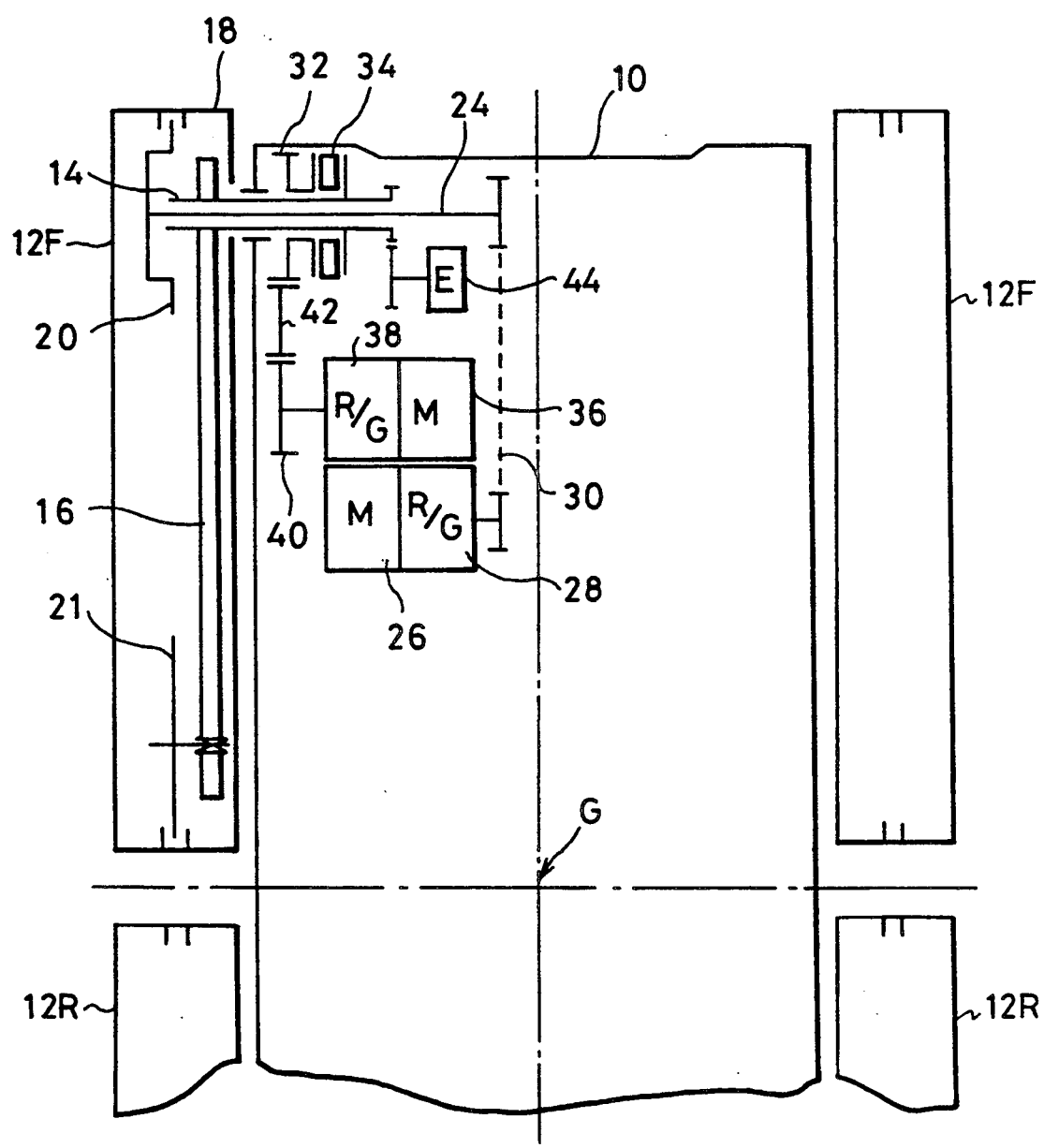
FIG. 1 is a schematic view illustrating a drive mechanism of a disaster relief robot according to the present invention.
Figure 2:
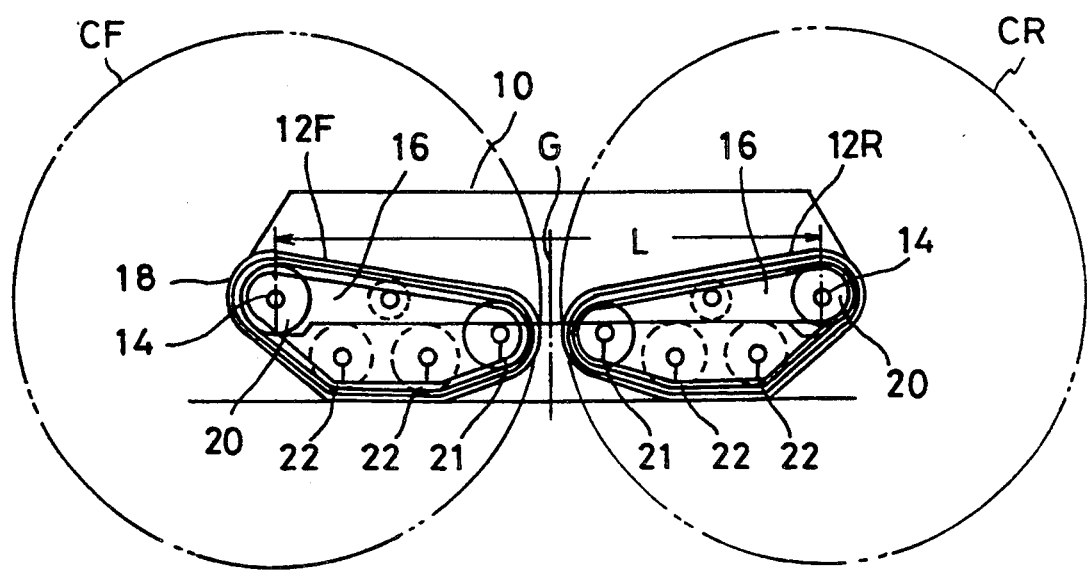
FIG. 2 is a side view illustrating the robot shown in FIG. 1.
Figure 3:
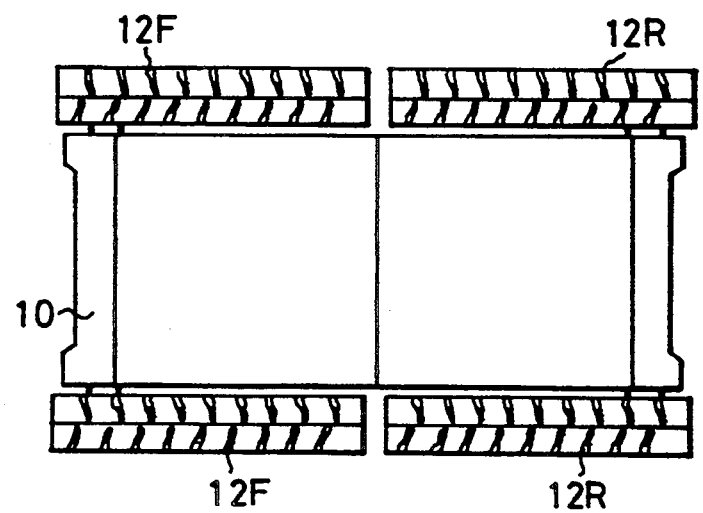
FIG. 3 is a plan view illustrating the robot.
Figure 4:
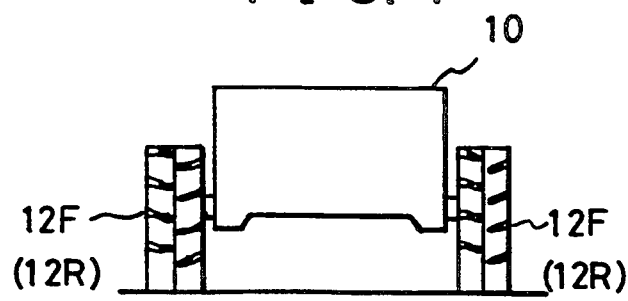
FIG. 4 is a front view illustrating the robot.

FIG. 1 is a schematic view illustrating a drive mechanism of a disaster relief robot according to the present invention, and FIGS. 2 to 4 are external views illustrating the robot. This robot incorporates crawlers 12F(R) which are pivoted by drive sources independent from each other, respectively, at four corners of a robot body 10. A track frame 16 for each of the crawlers 12F(R) incorporates a pivot shaft 14, and accordingly, the track frame 16 is attached to the body so that it can be pivoted by an angle of 360 deg. about the pivot shaft 14. In this arrangement, the front and rear crawlers 12F, 12R on one side of the robot body 10 are attached to the robot body 10 so that their pivot shafts 14 are spaced from each other in order to prevent their maximum pivoting loci CF, CR from overlapping with each other. That is, the inter pivot shaft distance L between the front and rear crawlers 12F, 12R is set to be greater than the sum of the radii of these maximum pivoting loci CF, CR. Further, setting is made such that the gravitational center G of the robot body 10 passes through a position intermediate between these maximum pivoting loci CF, CR, and that the ground contact positions of the front and rear crawlers 12F, 12R are always outside of the gravitational center G of the body. Accordingly, the front and rear crawlers 12F, 12R are located at positions near to the front and rear ends of the robot body 10. In the pivoting operation of these crawlers, a maximum extended condition in which the pivoting distal ends of the front and rear crawlers 12F, 12R are extended respectively in the front and rear of the robot body 10, and a minimum retracted condition in which the pivoting distal ends are directed toward the gravitational center of the robot body can be taken.

Explanation will be made of a drive mechanism for the crawler 12F(R) attached to the robot body 10 as mentioned above. Each crawler 12F(R) is composed of the track frame 16, a drive sprocket 20 located at one end of the track frame 16, an idler 21 located at the other end thereof, rotary wheels 22 disposed between the sprocket 20 and the idler 21, and a rubber track 18 wound around thereof. The traveling rotary shaft 24 of the sprocket 20 extends into the robot body 10 and is rotated by a travelling motor 26 through the intermediary of a reduction gear 28 and a chain 30. Further, the rubber track 18 is driven so as to be rotated around the outer periphery of the track frame 16, and accordingly, the robot can travel.

Further, the pivot shaft 14 is a hollow cylindrical shaft in which the travelling rotary shaft 24 is enclosed, and is made to extend connection with the track frame 16 into the robot body 10 from each end part of one side surface of the robot body 10 through the intermediary of a bearing. A gear 32, which is rotatably fitted on the outer peripheral surface of the pivot shaft 14, is integrally incorporated with the latter by means of a torque limiter 34. Meanwhile, a pivoting motor 36 and a reduction gear 38 for applying a drive torque to the gear are provided in the robot body 10, and a drive gear 40 fitted on the output shaft of the reduction gear 38 is coupled with the gear 32 through the intermediary of an intermediate gear 42. Accordingly, the drive torque of the pivoting motor 36 is transmitted to the pivot shaft 14 by way of the reduction gear 38, the drive gear 40, the intermediate gear 42, the gear 32 and the torque limiter 34 so as to pivot the track frame 16 of the crawler 12F(R). The above-mentioned torque limiter 34 is adapted to cut off the power transmission path when a forcible pivoting force is applied to the respective crawler 12F(R) due to a downfall or the like, and accordingly, the engagement between the pivot shaft 14 and the torque limiter 34 fitted on the pivot shaft 14 is released.

A rotary encoder 44 is attached to the pivot shaft 14 so as to detect a rotational position of the pivot shaft 14 or a pivoting position of the track frame 16. In particular, this encoder is provided on a pivot transmission path extending from the torque limiter 34 to the track frame 16.

Figure 5:
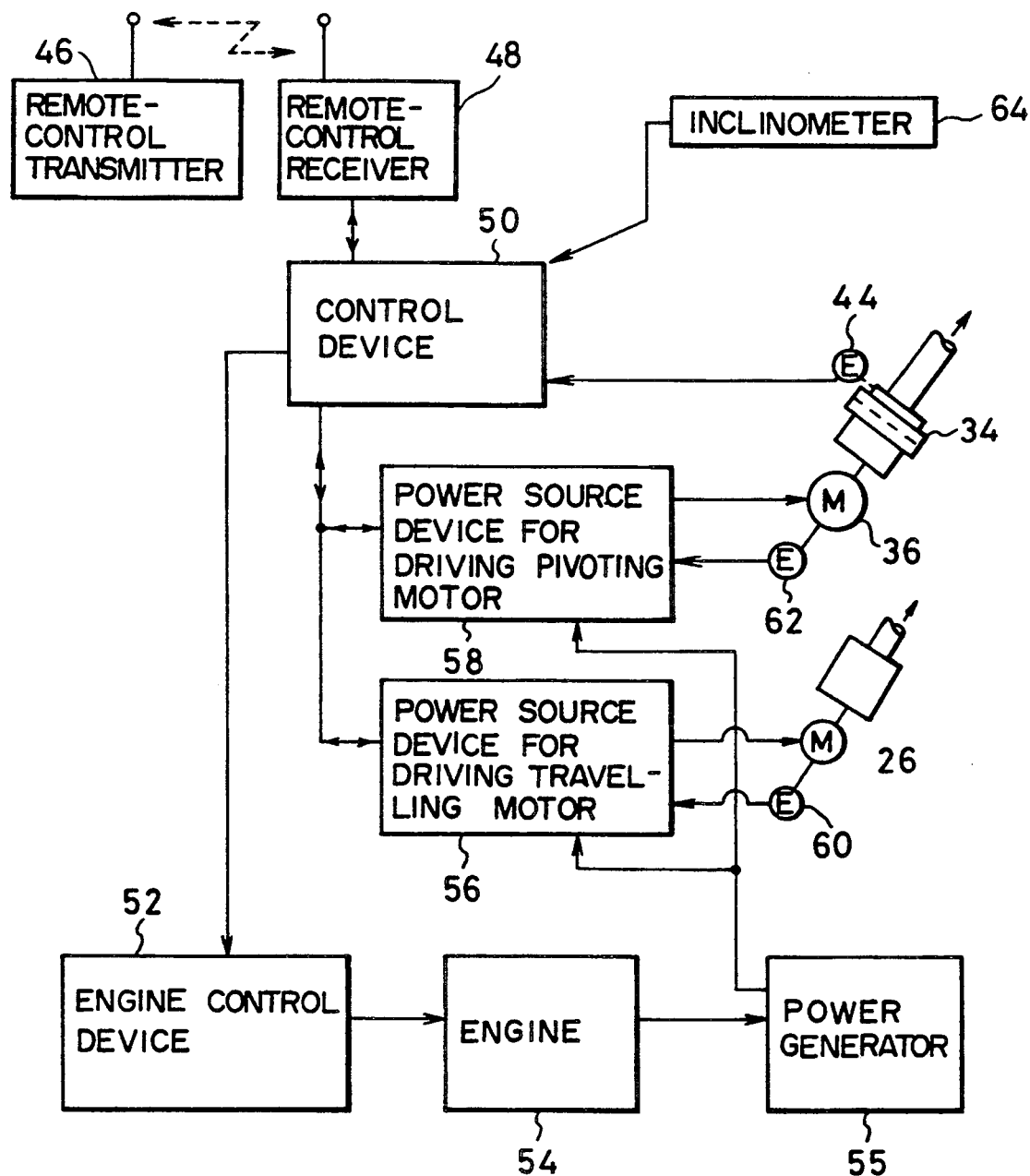
FIG. 5 is a block diagram illustrating a maneuver control system of the robot.

The above-mentioned drive mechanism is independently provided in each of the crawlers 12F(R), and is adapted to solely carry out travelling drive and pivoting operation. FIG. 5 is a block diagram illustrating a maneuver control system for the robot. This robot is remote-controlled by a maneuver signal from a remote control transmitter 46. Thus, a remote control receiver 48 and a control device 50 are disposed in the robot body 10. This control device 50 receives the maneuver signal and delivers a fuel control signal to an engine control device 52 for controlling an engine 54. The engine 54 drives a power generator 55 serving as a power source for the travelling motors 26 and the pivoting motors 36. Further, the control device 50 delivers a control signal to motor drive power source devices 56, 58 for regulating the rotating powers to the motors 26, 36 while it receives measurement signals from speed control encoders 60, 62 so as to perform feed-back control in order to set a travelling speed and a pivoting angle in accordance with the above-mentioned maneuver signal. Further the control device 50 directly receives an output signal from the encoder 44 for detecting a rotating angle of the pivot shaft 14, and also receives a measurement signal from an inclinometer 64 for detecting an inclination of the robot body 10.

Next, explanation will be made of operation of the thus constituted disaster relief robot. In the case of such an anticipation that the robot possibly falls down due to a precipice or a cave-in in a disaster area, an abnormal inclination of the robot body 10 on advance is detected with the use of an output signal from an inclinometer 64 mounted on the robot, without using a visual detection, so as to issue an abnormal alarm so as to call the attention of the operator, and to recover its posture in order to prevent the entire robot from falling down even though the front crawlers 12F fall downwardly into the cave-in depression.

Figure 6A:
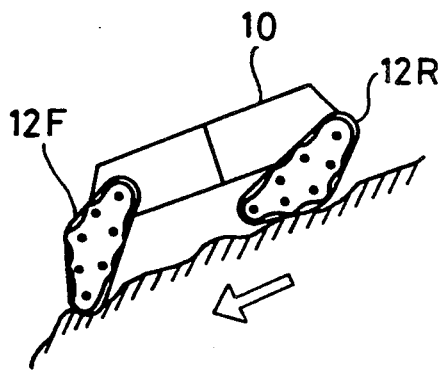
FIGS. 6(a)-6(f) are views for explaining the operation of the robot at a drop-off, with FIG. 6(a) illustrating a survey posture of the robot during forward motion along a downward incline, FIG. 6(b) illustrating the front crawler of the forwardly moving robot dropping at a drop-off in the downward incline, FIG. 6(c) illustrating the front crawler of the forwardly moving robot falling so that the robot body contacts the ground, FIG. 6(d) illustrating a reference posture of the robot, FIG. 6(e) illustrating a position of the robot in which the gravitational center of the robot is being shifted toward the rear of the robot, and FIG. 6(f) illustrating the movement of the robot rearwardly from the drop-off.
Figure 6D:
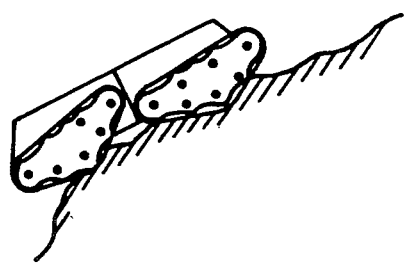
Figure 6B:
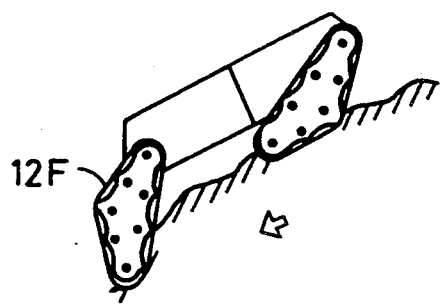
Figure 6E:
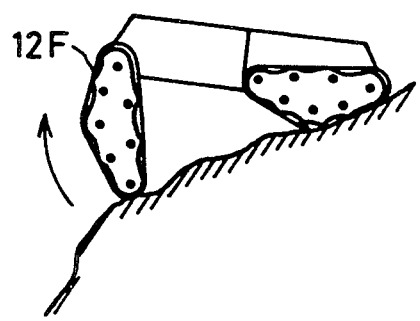
Figure 6C:
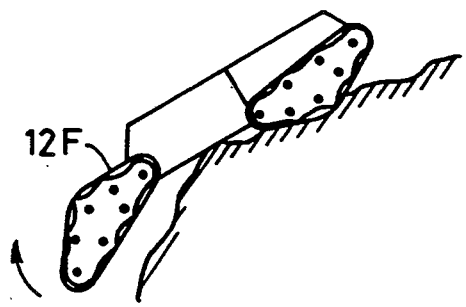
Figure 6F:
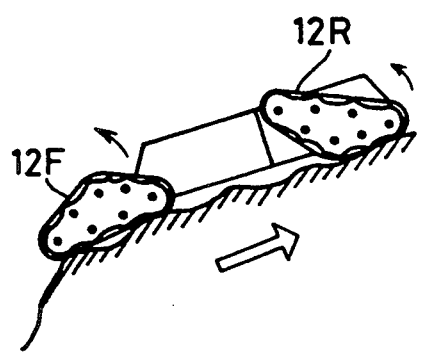

That is, as shown in FIG. 6(a), in an area in which the presence of a drop-off is anticipated, the robot travels with such a survey posture that the front crawlers 12F are pivoted, and accordingly, their distal ends are positioned in front of the robot body 10 while the distal ends of the rear crawlers 12R are positioned toward the gravitational center side of the robot body 10. When the front crawlers 12F drop during the forward travel, the robot body 10 is inclined forwardly and downwardly (as shown in FIG. 6(b)). At this time, it cannot be clearly determined whether the sharper inclination is caused by a drop-off at a cave-in or at a concavity and a convexity on the ground surface. Thus, the advance is continued. If it is caused by the drop-off at a cave-in, the front crawlers 12F completely drop into the cave-in, that is, the bottom of the front section of the robot body 10 comes into contact with the ground surface just prior to the cave-in depression (FIG. 6(c)). In this condition, the front crawlers 12F race or exhibit an abnormally light load while the inclinometer 64 indicates an abnormally inclined condition, and accordingly, an automatic determination can be made. The operator who hears the alarm issued at that time, reverses the travelling motors 26 so as to rapidly brake the crawlers in order to stop the robot body 10. Then, the front crawlers 12F are pivoted upwardly so as to return the robot to its reference posture in which the pivoting distal ends of the front and rear crawlers 12F, 12R are in proximity to each other (as shown in FIG. 6(d)). Since the pivoting loci of the front and rear crawlers 12F, 12R do not overlap with each other, this pivoting operation can be readily made. In this case, if the position adjacent to the cave-in depression is inclined forwardly, the substantial part of the weight of the body is applied to the front crawlers 12F, and accordingly, if the front half parts of the crawlers 12F have entered into the cave-in depression, no gripping force sufficient for supporting the load can be exhibited. Accordingly, the front crawlers 12F are further pivoted so as to raise the front section of the robot body 10 in order to rearwardly shift the gravitational center of the robot body, and therefore, the rear crawlers 12R are applied with a load, thereby it is possible to obtain a stable gripping force (FIG. 6(e)). After the robot goes backwardly to a sufficiently safe position (FIG. 6(f)), the robot is returned again into the survey posture, and then the robot goes into another course.

Next, explanation will be made of a bank overriding operation of the disaster relief robot with which the robot travels over a bump, with reference to FIGS. 7(a)-7(h).

Figure 7A:
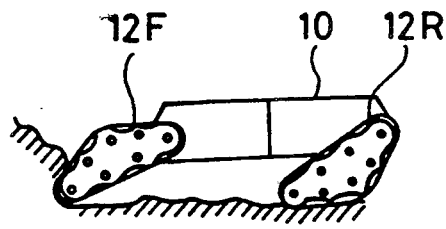
FIGS. 7(a)-7(h) are views for explaining a bank overriding operation of the robot, with FIG. 7(a) illustrating the forward moving robot in a survey posture abutting against a bump, FIG. 7(b) illustrating the front crawler's ascent of the bump, FIG. 7(c) illustrating the movement of the rear crawlers to raise the body of the robot, FIG. 7(d) illustrating the forward movement of the robot over the bump, FIG. 7(e) illustrating the rear crawlers making close contact with the inclined surface of the bump, FIG. 7(f) illustrating the ascent of the rear crawlers, FIG. 7(g) illustrating the return to the original forwardly moving survey posture, and FIG. 7(h) illustrating the advancing of the robot in the survey posture.
Figure 7B:
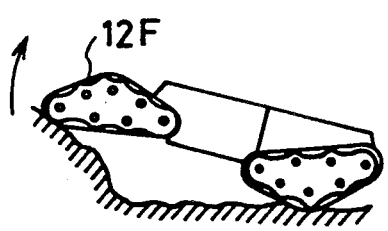
Figure 7C:
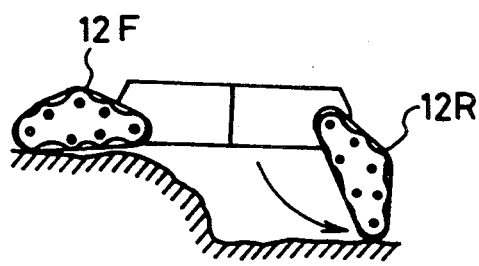
Figure 7D:
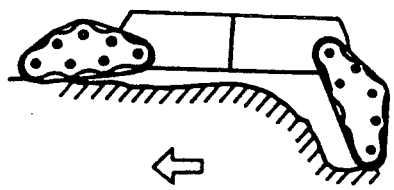
Figure 7E:
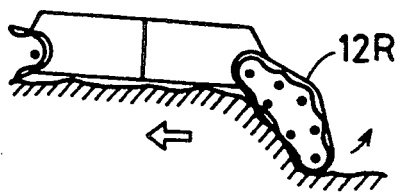
Figure 7F:
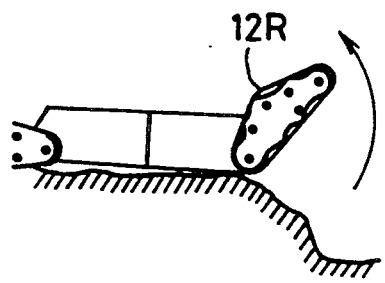
Figure 7G:
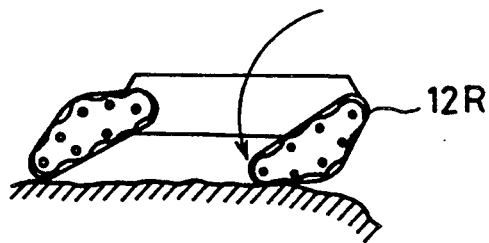
Figure 7H:
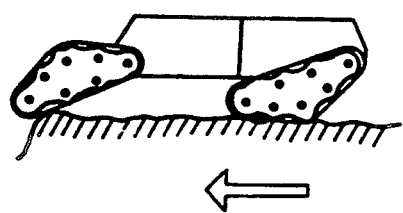

At first, as shown in FIG. 7(a), when the robot in the survey posture abuts against a bump, the front crawlers 12F are pivoted upwardly so as to hook their front ends onto the top part of the bump (as shown in FIG. 7(b)). Then, the front and rear crawlers 12F, 12R are pivoted downwardly so as to raise the robot body 10 (as shown in FIG. 7(c)), and the pivoting is stopped when the bottom section of the robot body 10 becomes higher than the top part of the bump, and then it is advanced as it is (as shown in FIG. 7(d)). After the rear crawlers 12R reach an inclined surface of the bump, the distal ends of the rear crawlers 12R are pivoted upwardly, and accordingly, the crawlers 12R are advanced while in close contact with the inclined surface (as shown in FIG. 7(e)). In this stage, since the gravitational center of the robot body has sufficiently moved onto the bump so as to be stable thereon, the rear section of the robot body 10 supports the weight of the body in such a condition that the rear section of the robot body 10 makes contact with the ground surface, thereby it is possible to prevent the robot body 10 from slipping down rearwardly (as shown in FIG. 7(f)). Accordingly, the upward pivoting is continued to recover the original posture (as shown in FIG. 7(g)), and accordingly, it can be advanced again (as shown in FIG. 7(h).

Further, if a downfall accident occurs, a large impact force is applied to the crawlers 12 so as to tend to forcibly pivot the same. This external pivoting force tends to forcibly rotate a pivot shaft 14 so as to produce an excessive torque. However, since the torque limiter 34 is disposed intermediate of the power transmission system, no impact force is transmitted to the power source. Accordingly, it is possible to surely prevent the pivoting motors 36 and the transmission mechanism having a high gear ratio from being damaged. Further, since the encoder 44 for detecting a pivoting angle is fitted on the pivot shaft 14, a pivoting angle can be detected even though the transmission system between the crawler 12 and the power source is cut off. Accordingly, even though a deviation is produced in the correspondence between the rotating angle of the pivoting motor 36 and the associated crawler 12, the control system of the robot can precisely measure the updated pivoting angle of the crawler 12. Accordingly, even though the crawler 12 is forcibly pivoted upwardly to an unexpected angle since it encounters an unexpected drop-off accident, the operation control can be at once continued just after that.

Figure 8A:
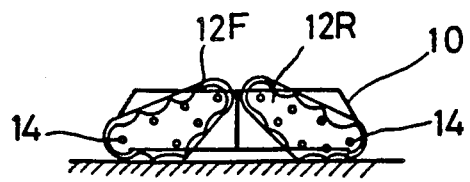
FIGS. 8(a)-8(d) are views for explaining a typical posture the robot can take, with FIG. 8(a) illustrating a storage posture of the robot, FIG. 8(b) illustrating a reference posture of the robot, FIG. 8(c) illustrating a bridging posture of the robot, and FIG. 8(d) illustrating a steep slope climbing posture of the robot.
Figure 8B:
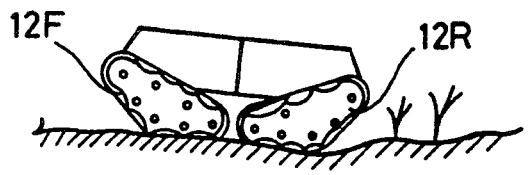
Figure 8C:
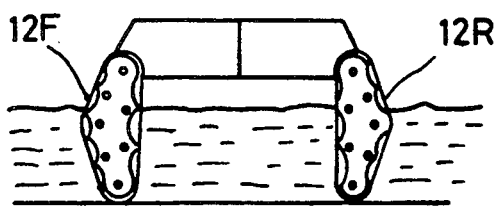
Figure 8D:
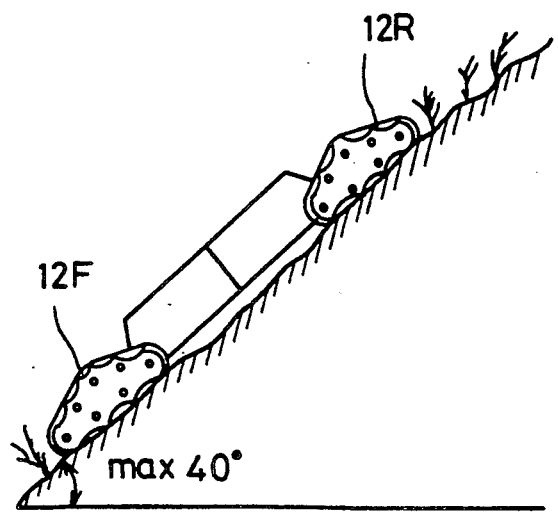

Since the thus constituted disaster relief robot has a large space between the pivot shafts 14 of the front and rear crawlers 12F, 12R in addition to the above-mentioned function, there can be taken a storage posture in which the length and height of the robot are minimum as shown in FIG. 8(a), the reference posture (as shown in FIG. 8(b), and a bridging posture (as shown in FIG. 8(c)), a steep slope climbing posture (as shown in FIG. 8(d)) and the like. It is noted that a wench can be attached to the front or rear section of the robot body 10 so that one end part of a wire rope can be wound on a tree or a rock while the other end part thereof can be wound up (ascent) or paid off (descent) by the winch in order to assist the ascent and the descent or to prevent the robot from dropping, thereby it is possible to ascend or descend a steep slope in a safer manner.

With the disaster relief robot according to the present invention, the capability of overriding a bump is greatly enhanced, which is several times as large as that of the conventional one, and a downfall accident can be avoided even though a cave-in depression is encountered, thereby it is possible to safely transport relief supplies in an outdoor disaster field. Further it is possible to prevent damage to the drive mechanism or a damage thereto can be compensated for by a simple repair even though a downfall accident occurs, and accordingly, it is possible to safely and surely transport a large number of relief supplies in a short time.

Figure 9:
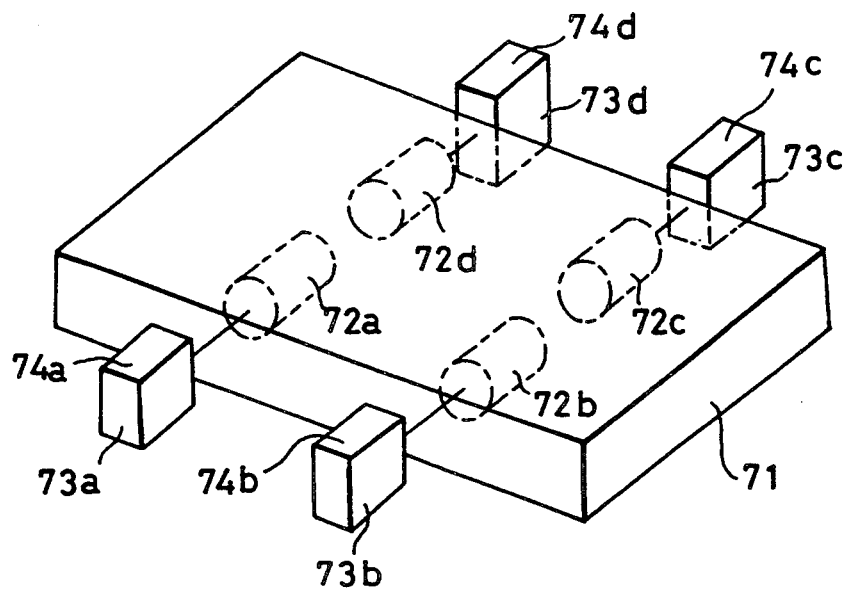
FIG. 9 is a schematic perspective view illustrating a controller with which a first embodiment of an operation controller according to the present invention is explained.

Next, explanation will be made in detail of a first embodiment of the operation controller according to the present invention with reference to FIGS. 9 to 13. Referring to FIG. 9, a controller 71 for remote control incorporates four rotating angle detectors 72a, 72b, 72c, 72d, and knobs 73a, 73b, 73c, 73d for controlling the postures of the crawlers 12 are fitted onto the shafts of the detectors 72a, 72b, 72c, and 72d, respectively. These four rotating angle detectors 72a, 72b, 72c, 72d are adapted to set desired values of the pivoting angles of four crawlers 12a, 12b, 12c, 12d of the robot body 10 when the operator manually remote-controls the pivoting angles of the four crawlers. The four knobs have a flattened shape, each having, at their one longitudinal end, marks 74a, 74b, 74c, 74d, and are arranged on opposite sides of the controller 71, at two positions on each side. The operator can recognize, by intuition, the respective pivoting angles of the four crawlers 12a, 12b, 12c, 12d whenever he observes the four knobs 73a, 73b, 73c, 73d on the controller 71, and accordingly, it is possible to enhance the remote controllability.

Figure 10:
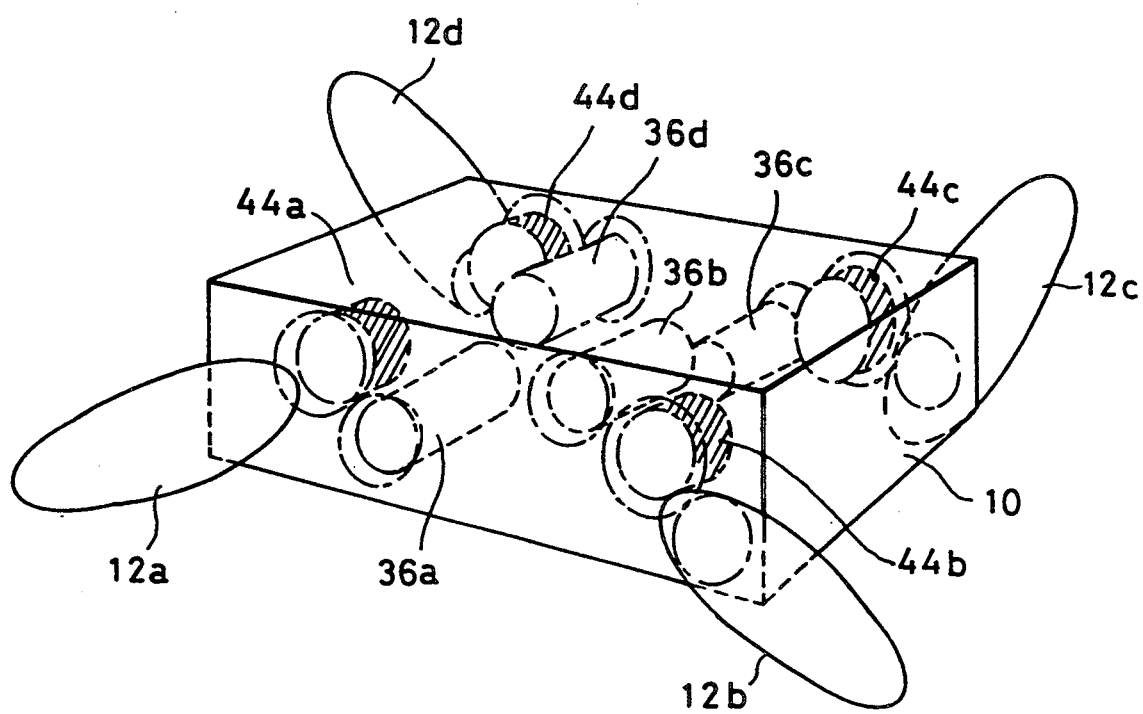
FIG. 10 is a schematic external view illustrating a robot body.
Figure 11:
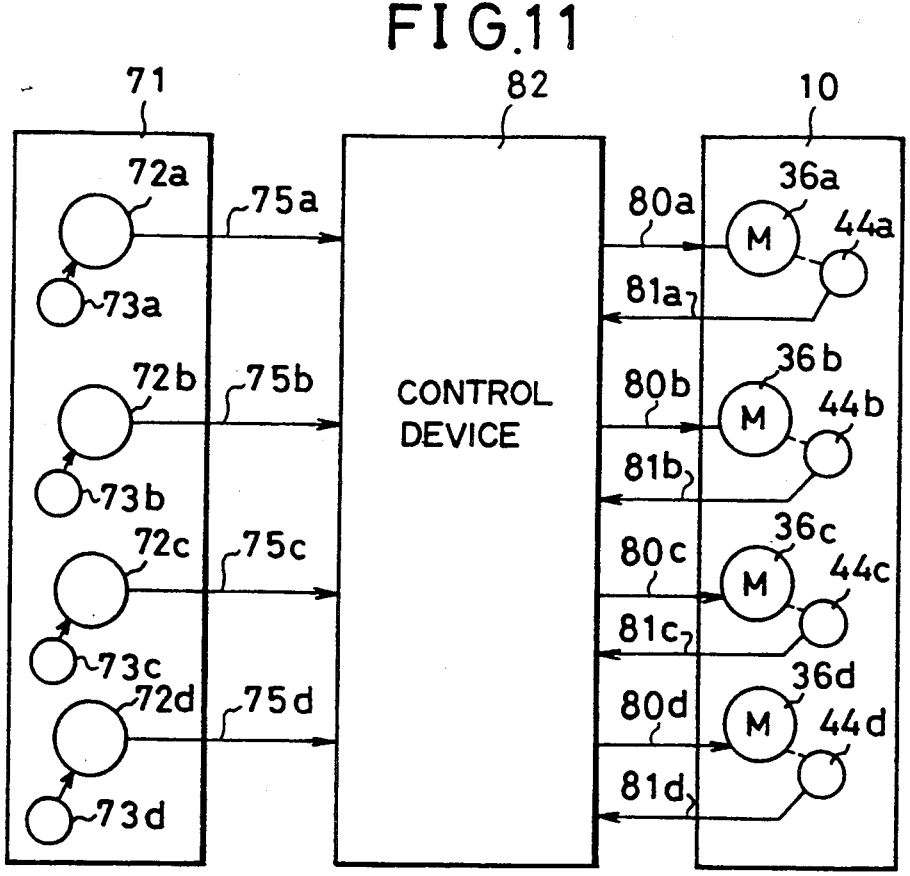
FIG. 11 is a view illustrating an interconnection among the controller, a control device and the robot body, relating to the operation controller shown in FIG. 9.

Explanation will be made of the operation of the first embodiment of the operation controller according to the present invention. As shown in FIG. 10, the four crawlers 12a, 12b, 12c, 12d are pivoted by 360 deg. by means of pivoting motors 36a, 36b, 36c, 36d. In order to detect actual pivoting angles thereof, pivoting angle detectors 44a, 44b, 44c, 44d are attached. FIG. 11 shows the relationship among the controller 71, a control device 82 and the robot body 10. The rotating angle detectors 72a, 72b, 72c, 72d deliver signals 75a, 75b, 75c, 75d indicating desired pivoting angles of the crawlers in accordance with rotating angles of the knobs 73a, 73b, 73c, and 73d on the controller 71, as input signals to the control device 82 which delivers pivoting drive voltage signals 80a, 80b, 80c, 80d to the pivoting motors 36a, 36b, 36c, 36d. The pivoting angle detectors 44a, 44b, 44c, 44d detect pivoting angles of the pivoting motors 36a, 36b, 36c, 36d and deliver pivoting angle signals 81a, 81b, 81c, 81d as input signals to the controller 82.

Figure 12:
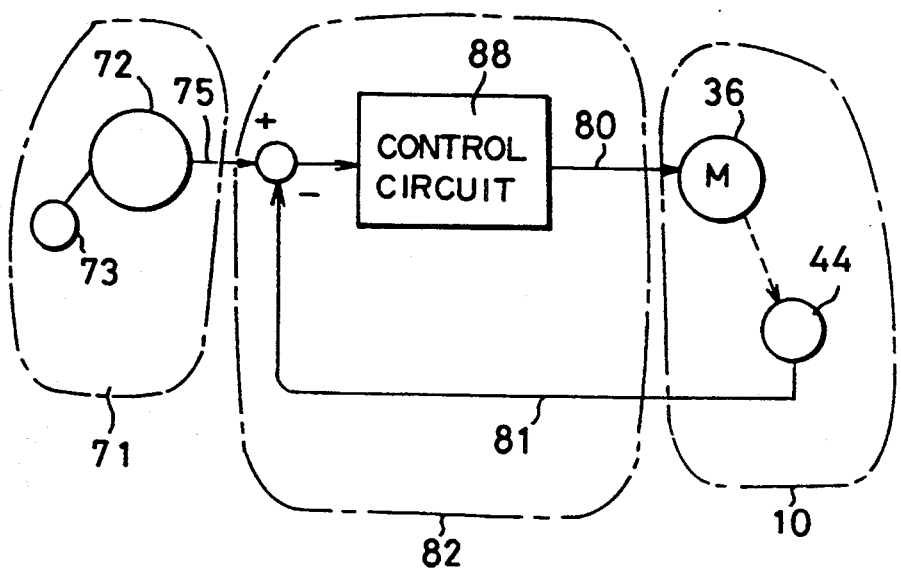
FIG. 12 is a block diagram illustrating a maneuver control system based upon FIG. 11.

One of the four maneuver control systems will be explained with reference to FIG. 12 which is a block diagram. Referring to this figure, a difference between the desired crawler pivoting angle signal 75 delivered from the rotating angle detector 72 and the pivoting angle signal 81 fed back from the pivoting angle detector 44 is inputted to a control circuit 88 which is an amplifier for carrying out, for example, PID control, and which incorporates a power amplifier for generating a voltage as an output sufficient to drive the pivoting motor 36.

Figure 13:
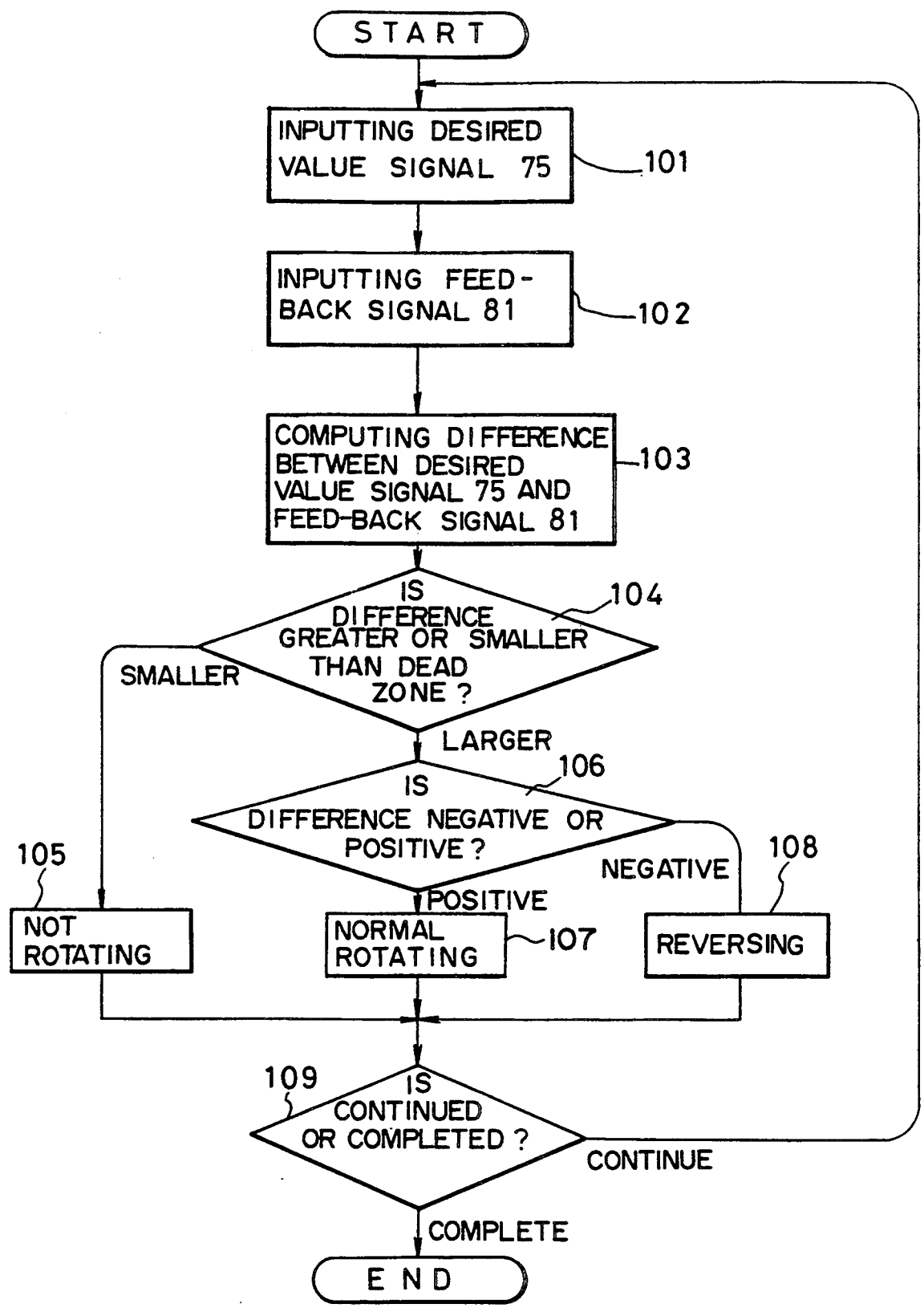
FIG. 13 is a flow chart for explaining an operation of the operation controller carried out by a microcomputer.

FIG. 13 is a flow-chart for explaining the operation of the operation controller with the use of a microcomputer. First, at step 101, the desired pivoting angle signal 75 is inputted from the rotating angle detector 72. If the rotating angle detector 72 is a multiple rotation type potentiometer, the output signal thereof is a voltage which is therefore converted, by an A/D converter, into the desired pivoting angle signal 75 which is then inputted. If the rotating angle detector 72 is an increment type two phase pulse encoder, the output signal thereof is a serial pulse signal having a logic output voltage (or current), and accordingly the desired pivoting angle signal 75 is inputted with the use of a counter. Further, if the rotating angle detector 72 is an absolute type pulse encoder, the output signal thereof is a parallel pulse signal having a logic output voltage (or current), and accordingly the desired pivoting angle signal 75 is inputted with the use of a parallel peripheral input. Any one of the combinations having a function which can detect the abovementioned rotating angle can be used as the above-mentioned combination. Next, at step 102, an actual pivoting angle of the crawler is inputted as a feed-back signal 81 from the pivoting angle detector 44. A combination similar to that of the abovementioned rotating angle detector 72 can be used for the pivoting angle detector 44 and its input circuit. Then, at step 103, the desired pivoting angle signal 75 and the feedback signal 81 are compared with each other so as to compute an angular difference therebetween. This angular difference is positive if it is within 180 deg. as measured clockwise, but is negative if it is less than 180 deg. as measured counterclockwise. Step 104 is present in the case of a dead zone provided in the maneuver control system. If the absolute value of the angular difference is less than a predetermined numerical value set as the dead zone, the procedure is advanced to step 105 so that no signal is delivered to the pivoting motor 36. On the contrary, if it is larger, the procedure is advanced to step 106 where a determination is made as to whether the angular difference is a positive value or a negative value. If the angular difference is positive, the procedure is advanced to step 107 where a positive voltage is fed to the pivoting motor 36 which is therefore rotated normally. On the contrary, if the angular difference is negative, the procedure is advanced to step 108 where a negative voltage is fed to the pivoting motor 36 which is therefore reversed. At step 109, it is determined whether the procedure is continued in the case of receiving an abnormal signal or the procedure is completed in the case of receiving a completion instruction. In the case of the continuation, the procedure is returned to step 101 so as to repeat the above-mentioned operation, but in the case of the completion, this program is completed.

Next, explanation will be made of a second embodiment in which a bilateral control means is applied to the abovementioned operation controller, with reference to FIGS. 14 and 15. It is noted that the arrangement of the robot body is similar to that shown in FIG. 10, and that only one of the four control systems will be explained for the sake of brevity.

Figure 14:
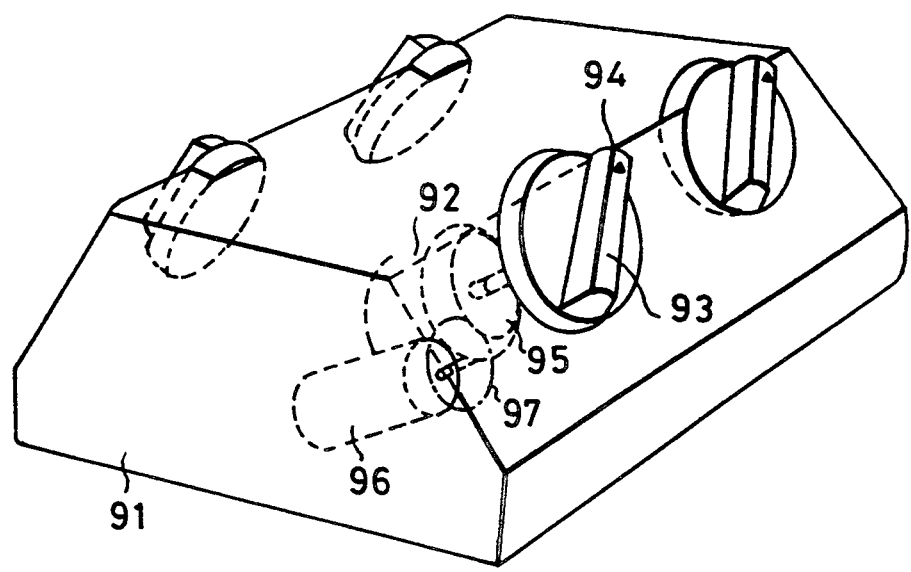
FIG. 14 is a schematic perspective view illustrating a controller with which a second embodiment of the operation controller according to the present invention is explained.
Figure 15:
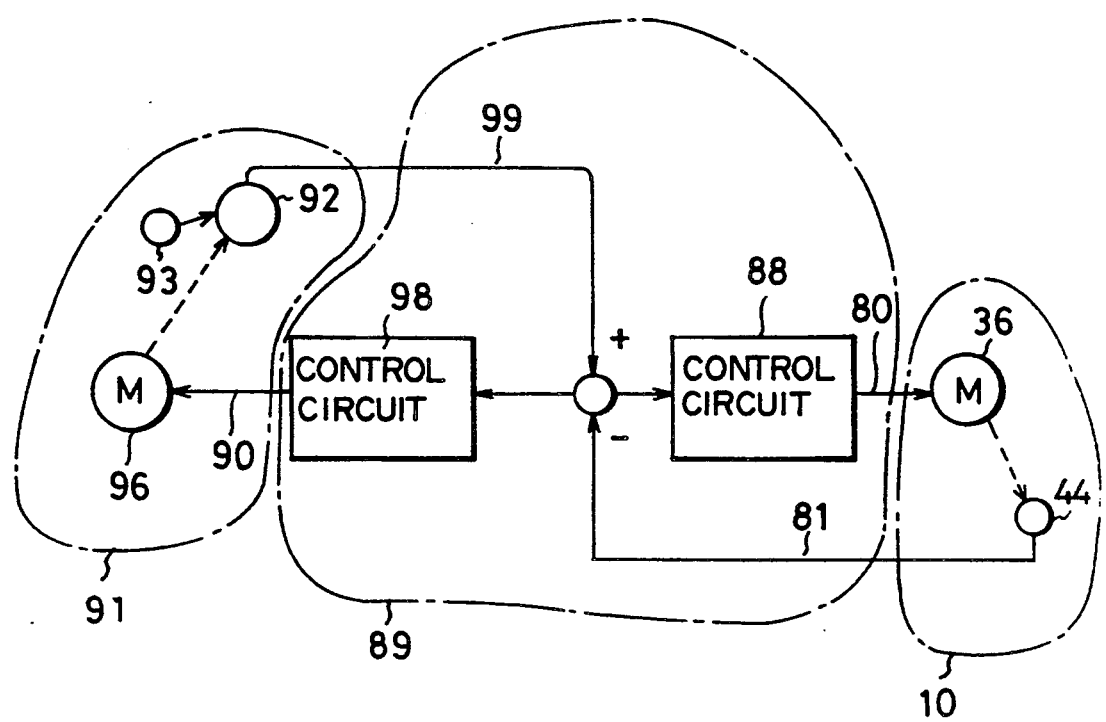
FIG. 15 is a block diagram illustrating a remote control system based upon FIG. 14.

As shown in FIG. 14, four knobs 93 for controlling the postures of the crawlers are attached to opposite inclined surfaces of a controller 91 in order to rotate the shafts of rotating angle detectors 92. These rotating angle detectors 92 are driven by small motors 96 through the intermediary of gears 95, 97. A mark 94 is provided at one longitudinal end of each of the knobs 93. Thus, referring to FIG. 15 which is a block diagram, this embodiment will be explained. An output signal 99 delivered from the rotating angle detector 92 incorporated in the controller 91 is compared with a pivoting angle signal 81 from the pivoting angle detector 44 incorporated in the robot body 10, by means of the control device 89. The thus obtained difference signal is delivered to the control circuit 88 for the pivoting motor 36 in the robot body 10, and to a control circuit 98 for the small motor 96 in the controller 91. The former control circuit 88 treats the output signal 99 from the rotating angle detector 92 as a desired pivoting angle signal, and a pivoting angle signal 81 from the pivoting angle detector 44 as a feed-back signal. Thus, the pivoting motor 36 attached to the robot body 10, generates a force which causes the crawler to pivot upwardly to an angle set by the rotating angle detector 92 in the controller 91. On the contrary, the latter control circuit 98 treats the pivoting angle signal 81 from the pivoting angle detector 44 as a desired rotating angle signal at the rotating angle detector, and the output signal 99 from the rotating angle detector 92 as a feed-back signal. Accordingly, the greater the difference from the present value at the pivoting angle detector 44, the larger the force for returning the posture of the crawler to the present value is produced by the small motor 96 attached to the controller 91. In this second embodiment, the flow-chart for the operation using a microcomputer is similar to that shown in FIG. 13. That is, paying attention to the fact that the relationship between the desired value signal and the feed back signal in the case of the control circuit 98 is contrary to that in the case of the control circuit 88, it can be regarded as the same as the flow-chart in the case of the control circuit 88 shown in FIG. 13. That is, if the pivoting motor in the robot body 10 is in a light load condition so that the pivoting motor 36 is rotated as soon as the knob 93 on the controller is rotated, the force with which the small motor 96 in the controller 93 reversely rotates the knob 93 toward the present value of the angle of the crawler is decreased. On the contrary, if the pivoting motor is in a heavy load condition so that the pivoting motor 36 can be hardly rotated even though the knob 93 on the controller 91 is rotated, the force with which the small motor 96 in the controller 91 reversely rotates the knob 93 toward the present value of the angle of the crawler is increased. Therefore, the operator has to rotate the knob 93 with his strength. That is, with the application of the bilateral control means in the above-mentioned operation controller, the operator can not only directly feel the posture of the crawler of the robot body 10 from the rotating angle of the knob 93 on the controller, but also can feel in his body the load condition of the crawler in the form of the pivoting resistance as the knob 93 is rotated. It is noted that any bilateral system other than the bilateral system which is explained in reference to FIG. 15 and which is well known as a symmetric type in the society in the field or the like, such as that of a force feed-back type or an impedance type can be used to constitute the operation controller according to the present invention, instead of the symmetric type in the above-mentioned embodiment.

Thus, when the disaster relief robot slips at a precipice or on a slope, or when the robot stumbles over a rock or a piece of wood so that its posture becomes unstable, the posture of the robot can be grasped with a high response, and accordingly, the operation of the robot can be surely and safely carried out.

Next, a third embodiment of the operation controller according to the present invention will be explained in detail, referring particularly to FIGS. 16 and 17. Incidentally, the drive mechanism for pivoting and running the disaster relief robot is the same as that shown in FIGS. 1 to 8.

(1) Survey Posture Process

Figure 17A:
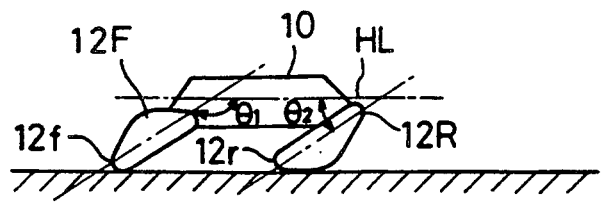
FIGS. 17(a)-17(g) are views for explaining an operation of the robot coping with the process shown in FIG. 16, with FIG. 17(a) illustrating a survey or reference posture of the robot in a downfall preventing mode, FIG. 17(b) illustrating the robot encountering a drop-off having a inclination angle greater than a threshold angle, FIG. 17(c) illustrating the robot extending partially over the drop-off such that the front crawlers do not experience a large load, FIG. 17(d) illustrating the robot extending partially over the drop-off with the front crawlers, which have been rotated to an upright condition, encountering a ground surface such that the front crawlers experience a large load, indicating a possible descent condition, FIG. 17(e) illustrating the robot extending partially over the drop-off with the front crawlers, which have been rotated to an upright condition, not encountering any ground surface, indicating an impossible descent condition, FIG. 17(f) illustrating the forward moving robot landing after a possible descent determination, and FIG. 17(g) illustrating the robot moving rearwardly away from the drop-off after an impossible descent determination.

If the operator feels that the disaster relief robot which travels in a cave-in zone including a precipice or the like has to prepare for preventing a downfall in the case of an accident, he turns on a "downfall preventing switch" which is incorporated in the remote-control transmitter 46 and which is not shown. At this time, the process shown in FIG. 16 is started. At first, the pivoting angles of the front and rear crawlers 12F, 12R of the robot body 10 are controlled by the power source device 58 for driving the pivoting motors 36, and accordingly, as shown in FIG. 17(a), the front crawlers 12F are set at a pivoting angle 81 at which the front crawlers 12F are extended forwardly from the robot body 10 while the rear crawlers 12R are set at a pivoting angle 82 at which the rear crawlers 12F are extended toward the gravitational center G of the robot body. It is noted that the pivoting angle 82 is set to zero when the longitudinal direction of the front and rear crawlers 12F, 12R is parallel with the horizontal line HL and the distal ends 12f, 12r thereof are directed toward the gravitational center G of the body. The posture at this time will be hereinbelow denoted as "reference posture".

When the robot advances in the above-mentioned survey posture, the control device 50 samples deviations in speed control systems for the front crawlers 12F and outputs from the inclinometer 64 so as to pick up loads exerted on the front crawlers 12F and a longitudinal inclined angle of the robot.

Explanation will be hereinbelow made of the way of obtaining a load exerted on the front crawler 12F from a deviation in the speed control system for the front crawler 12F.

At the time of starting the process shown in FIG. 16, the gain of a control loop in the speed control system of the travelling motor 26 of a front crawler 12F is set to a remarkably low value. In this case, it can be considered in particular that the proportional gain or an integration gain of the control loop in the speed control system for the travelling motor 26 is adjusted to a lower value, or a current limitation or a torque limitation is applied to a servo-motor power source device 56 for the travelling motor 26 in order to prevent the travelling motor 26 from producing a torque exceeding a predetermined value. It is noted that the control loop gain of the travelling motor 26 for each rear crawler 12R is set to a value which is sufficient for reaching a desired speed given by the control device 50, irrespective of a load applied to the rear crawler 12R. With this arrangement, the travelling control can be made mainly by the drive force of the travelling motors 26 for the rear crawlers 12R while the travelling motors 26 for the front crawlers 12F only produce a torque compensating for a mechanical loss, for example, in the speed reduction gear 28. In other words, such a case that the travelling motors 26 for the front crawlers 12F are rotated at a speed corresponding to the desired speed, is that the front crawlers 12F mainly make contact with the ground surface while the robot body 10 is propelled by the drive force of the travelling motors 26 of the rear crawlers 12R, and accordingly, the travelling motors 26 for the front crawlers 12R are forcibly rotated. Thus, during travelling, by observing the speed control encoder 60 for detecting the rotation of the travelling motors 26 for the front crawlers 12F, whether the front crawlers 12F make contact with the ground surface or the like can be known. That is, if the detected rotational speed of the speed control encoder 60 sufficiently follows a desired speed instruction to the speed control system, it is found that the front crawlers 12F hold a sufficient friction force between themselves and the ground surface.

On the contrary, after a front crawler 12F approaches a precipice or a cave-in depression and this front crawler 12F becomes suspended so that it can no longer support the weight of the robot sufficiently, the other three crawlers hold the posture of the robot in an irregular arrangement while this front crawler 12F loses its friction force with respect to the ground surface, and accordingly, no drive force can be obtained from the ground surface. However, since the control loop gain is set to a low value, the detected rotational speed has a positive or negative large deviation from the desired speed instruction value. (At this time, if the motor power is weaker than a mechanical loss, the detected rotational speed becomes lower than the desired speed instruction value. On the contrary, if the motor power is stronger than the mechanical loss, a brake obtained from the ground surface is lost so that the detected rotational speed becomes higher than the desired instruction value.) Thus, by lowering the control loop gain of the speed control system of the travelling motor 26 for the front crawler 12F, a deviation in the speed control system greatly varies in dependence upon a ground contact condition of the front crawler 12F, and accordingly, by monitoring the degree of this deviation, the ground contact condition of the front crawler 12F is detected contrarily, that is, a load exerted on the front crawler 12F is detected, thereby it is possible to determine whether the front crawler 12F comes to a precipice or the like or not.

When the robot comes to a precipice or the like, there is a tendency such that both front crawlers leave the ground surface in their entirety so that they are inclined downwardly and forwardly. Such a condition can be found by monitoring the output of the inclinometer 64 for detecting an inclination of the robot body 10. However, the robot does not always incline even though it comes to a precipice or the like. That is, as mentioned above, it is in such case that one (for example, the left side one) of the front crawlers 12F alone leave the ground surface while the other three crawlers hold the posture of the robot in the irregular arrangement. At this time, the fact that the front left crawler comes to the precipice or the like can be detected by monitoring a deviation between the left and right speed control systems for the front crawlers 12F. With this arrangement, since a deviation between the left and right speed control systems of the front crawlers 12F is monitored, in addition to an output $\phi$ from the inclinometer 64, the fact that the robot comes to a precipice or not can be surely found even though the forward inclination of the robot body 10 is not definitely detected.

A predetermined computing process is carried out in accordance with outputs of the inclinometer 64 and deviations in the speed control systems which have been sampled by the control device 50 so as to obtain a threshold value $\phi 0$ of the inclined angle for determining whether the front crawler 12F departs from the ground surface or not, and a threshold valve T0 of the crawler load T, and these values are stored in a predetermined memory. The above-mentioned threshold values can be obtained by calculating an averaged value in a predetermined period, or a dispersion or a standard deviation in a predetermined period (step 202).

(2) Drop-Off Detecting Process

Subsequently, the control device 50 determines whether or not the load T exerted on the front crawler 12F is below the threshold value T0 (step 203), and also determines whether or not the inclined angle $\phi$ from the inclinometer 64 exceeds the threshold value $\phi 0$ (step 204).

As a result, if it is determined that the load T of at least one of the front left and right crawlers 12F is below the threshold value T0, or if it is determined that the inclined angle $\phi$ from the inclinometer 64 exceeds the threshold value $\phi 0$, it is determined that there is a risk of a downfall of the robot so that the procedure is advanced to step 205.

Figure 17B:
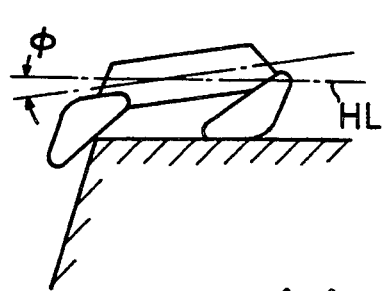

That is, as shown in FIG. 17(b), if the inclined angle $\phi$ exceeds the threshold value even though a load greater than the threshold value T0 is exerted on the front crawler 12F, it is determined that there is a risk of a downfall of the robot. Further, if a load T exerted on either one of the front crawlers 12F is below the threshold valve T0 even though the inclined angle $\phi$ is below the threshold value $\phi 0$, it is determined that there is a risk of a downfall of the robot. In this case, such a condition that one of the front left and right crawlers 12F drops down to an inclined surface of a precipice or the like while the other three crawlers hold the posture of the robot in the irregular arrangement, is indicated, as mentioned above.

Figure 17C:
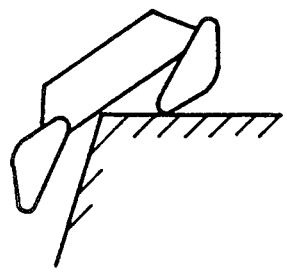
Figure 17D:
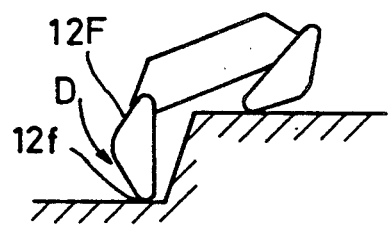

Further, sometimes, both of the front crawlers 12F leave the ground so that a value $\phi$ detected by the inclinometer 64 exceeds the threshold value $\phi 0$, and the load T becomes lower than the threshold value T0 (refer to FIG. 17(c)). However, since the robot takes such a survey posture that the front crawlers 12F are extended forwardly, the bottom of the robot body 10 is caught by a position just before the inclined surface so that the gravitational center G of the robot body is positioned just before the inclined surface, and accordingly, the robot does not soon fall down even if the front crawlers 12F alone drop down onto the inclined surface of the precipice or the like.

(3) Landing Determining Process

At this time, it is not yet understood whether a cave-in depression in front of the robot is shallow so that the robot can land as it advances or a deep precipice is present so that the robot would fall down as it advances. Accordingly, in order to avoid a risk of a downfall, an instruction for rotation is delivered to the power source device 56 for driving the travelling motors 26 which are therefore driven under control. As a result, the robot is decelerated. Simultaneously, an instruction for pivoting is delivered to the power source device 58 for driving the pivoting motors 36 which are therefore driven under control in order that the front crawlers 12F are made to stand upright so that their distal ends 12f are located at their vertically lowermost positions. As a result, the front crawlers 12F are pivoted by a predetermined angle toward the gravitational center G of the body as indicated by the arrow D in FIG. 17(d), and accordingly, such a posture that the longitudinal direction of the front crawlers 12F are vertical is taken (step 205).

Next, drive control for the travelling motors 26 is carried out in such a way that a process of advancing the robot by a predetermined distance at a slow speed and a process of withdrawing the robot by a predetermined distance at a slow speed are successively carried out. Such an advancing process at a slow speed and a retreating process at a slow speed can be repeated successively more than one time (step 206). During carrying out such processes, it is determined whether or not a load T exerted on either one of the front left and right crawlers 12F exceeds the threshold value T0 (step 207). As a result, if it is determined that the loads T exerted on the front crawlers 12F exceed the threshold value T0, it is determined that there is a shallow cave-in depression or a precipice at which the front left and right crawlers 12F can make contact with the ground in such a posture that they are made to stand upright, that is, it is determined that the robot can advance and land as shown in FIG. 17(f). Then, the procedure is shifted to step 208.

Figure 17E:
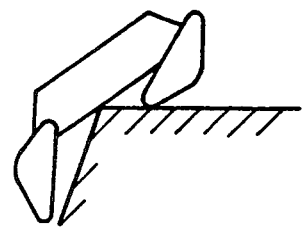
Figure 17F:
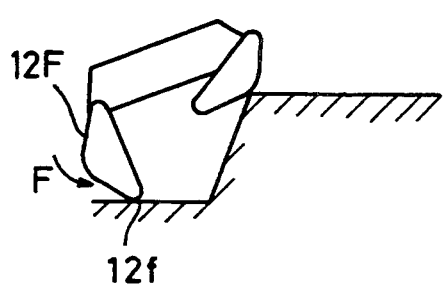
Figure 17G:
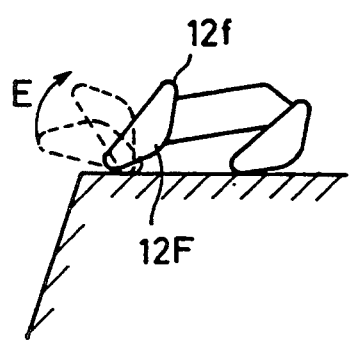
Figure 18:
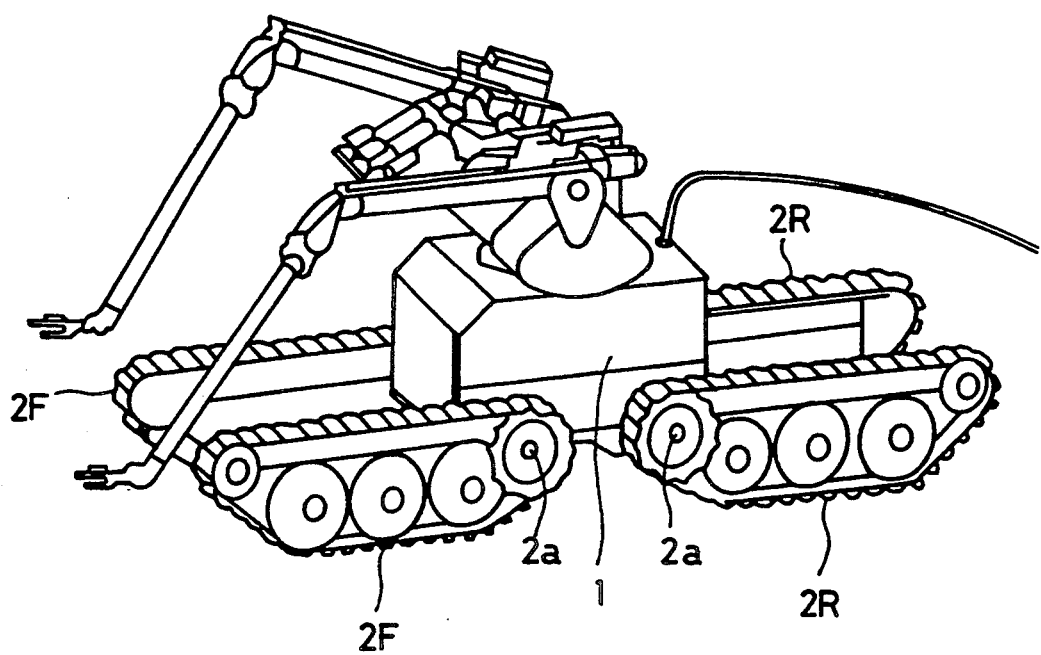
FIG. 18 is a perspective view illustrating a conventional travelling robot.
Figure 19A:
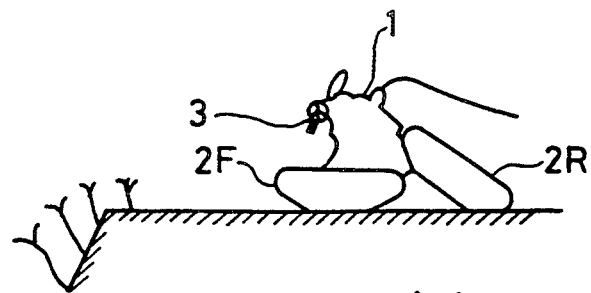
FIGS. 19(a)-19(f) are views for explaining the operation of the conventional travelling robot at a cave-in depression, with FIG. 19(a) illustrating a robot in an alert or warning posture with a camera pointed forwardly and downwardly at a cave-in depression drop-off obscured by weeds, FIG. 19(b) illustrating the advancing robot with the front crawlers leaving the ground at the edge of the drop-off, FIG. 19(c) illustrating the advancing robot with the front crawlers in an unsupported position and the gravitational center shifting forwardly, FIG. 19(d) illustrating the robot falling into the cave-in depression, FIG. 19(e) illustrating a position of the robot in which it cannot be readily determined whether the forward inclination of the robot is caused by a concavity or a convexity, and FIG. 19(f) illustrating the front crawlers of the backwardly moving robot slipping on muck and sand.
Figure 19B:
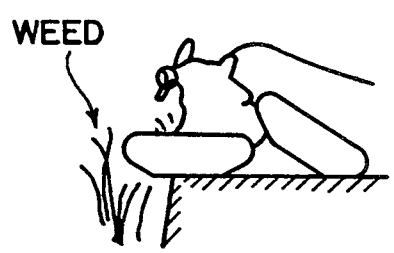
Figure 19E:
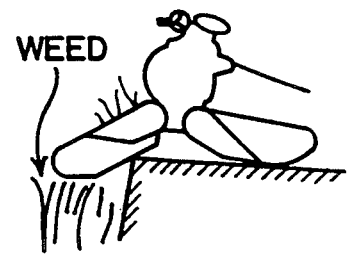
Figure 19C:
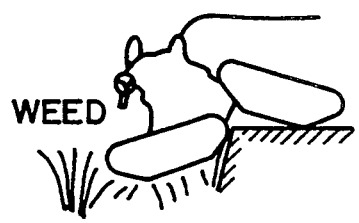
Figure 19F:
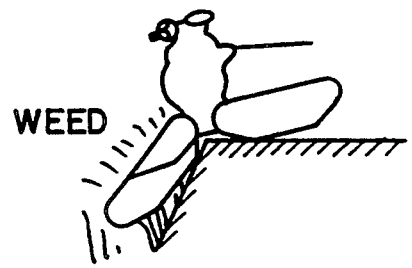
Figure 19D:
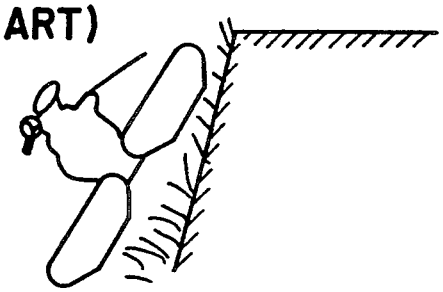

Meanwhile, if a load T exerted on either one of the front left and right crawlers 12F is below the threshold value T0, it is determined that there is a deep cave-in depression or a high precipice at which the front crawlers cannot make contact with the ground even through they are made to stand upright, that is, it is determined that the robot should fall down if it would advance as shown in FIG. 17(e). Then procedure is shifted to step 209.

(4) Landing Process

At step 208, an instruction for applying engine brake to the rear crawlers 12R is at first delivered to the power source device 58 for the travelling motors, and accordingly, the travelling motors 26 for the rear crawlers 12R are turned off. Simultaneously, an instruction for advancing the robot at a slow speed by means of the front crawlers 12F is issued. Accordingly, the robot is advanced at a low speed with the rear crawlers 12R being braked. Meanwhile, during this advance, the pivoting motors 36 are driven under control so that they are gradually pivoted toward the gravitational center G of the body further from the upright standing posture as shown by the arrow F in FIG. 17(f). Accordingly, the robot descents with a stable posture without the robot body 10 being abnormally inclined, and can safely land (step 208).

(5) Downfall Avoidance Process

Meanwhile, at step 209, the travelling motors 26 are at first driven under control so that the robot comes once to a stop. Next, the travelling motors 26 are driven under control so that the robot goes backwards. Simultaneously with this retreating, the pivoting angles of the front crawlers 12F are controlled so that the distal ends 12a of the front crawlers 12F which have been extended in front of the robot body 10 are gradually pivoted toward the gravitational center G of the body by way of a position above the robot body 10, and finally, the pivoting angles e of the front crawlers 12F are set to zero. That is, the front crawlers 12F are returned into the reference posture. By carrying out the above-mentioned process, the front crawlers 12F are returned to a condition in which they make contact with the ground surface just before the inclined surface from a condition in which-they are projected from the inclined surface, thereby it is possible to prevent the robot from falling down. Further, the travelling motors 26 are driven under control so that the robot 12 comes to a stop when the front crawlers 12F make contact with the ground surface just before the inclined surface.

It is noted that a warning signal can be delivered to the remote-control transmitter 46 by way of the remote control receiver 48 so that a buzzer or a lamp which is incorporated in the transmitter 46 and which is not shown is energized in order to call the attention of the operator when the process is shifted to step 209.

If the robot comes to a stop after the front crawlers 12F make contact with the ground surface just before the inclined surface, the operation mode is turned into a manual control mode conducted by the operator. The operator himself examines the height of the precipice and so forth so as to determine whether the robot can descend under manual remote-control or another path should be selected, or whether or not the advance should be enforced with the use of a winch, which is attached to the robot body 10, for climbing a steep slope, and then he manipulates the remote-control transmitter 46 so as to safely run the robot in accordance with his determination.

As mentioned above, according to this embodiment, it can be automatically and precisely determined in accordance with an inclined angle of the robot body 10 and a load exerted on the front crawlers 12F that there is a risk of a downfall of the robot, and the travelling and pivoting of the robot is automatically and surely controlled so as to prevent the robot from falling down.

Accordingly, without dependence upon the operator's monitoring ability and manual operation ability, the downfall accident of the robot can be automatically and surely avoided, and further, the operator can prevent himself from paying attention to the monitoring and operation of the robot, in comparison with the conventional one, thereby it is possible to alleviate the operator's fatigue. Accordingly, it is possible to prevent the operator himself from falling down or the like caused by his fatigue, thereby it is possible to ensure the safety for the operator.

Although the determination, as to whether the height of a precipice is so low that the robot can advance further or it is so high that the robot falls down if it advances, is made after the determination is made in this embodiment that there is a risk of a downfall of the robot, such a determination can be eliminated as the case may be. That is, when a determination is made that there is a risk of a downfall, the robot can be directly returned to the condition shown in FIG. 17(f), and thereafter, it can be manually controlled by the operator. Further, the downfall avoidance operation is made such that the distal end sections of the front crawlers 12F which are extended forwardly are pivoted rearwardly while the robot is moved backwardly. However, such an operation is only one example, any pattern of pivoting operation can be used if it can surely perform a downfall avoidance operation with the use of the crawler's characteristics such that the crawlers can be pivoted by any angle within a 360 deg. range.

Further, in this embodiment, although a load exerted on the front crawlers 12F is detected in accordance with a deviation in the speed control system of the travelling motors 26 for the front crawlers 12F, whose control loop gain is lowered, it can be detected in accordance with an armature current if the travelling motors are D.C. motors, or an output signal from an A.C. servo-amplifier if the travelling motors are A.C. servomotors. Further, a torque exerted on the front crawlers 12F can be detected directly by a torque sensor. Further, a load can be also detected in dependence upon whether or not the motors 26 are rotated when the front crawlers 12F are towed after the travelling motors 26 for the front crawlers 12F are de-energized. In this case, the value of the load can be detected by the speed control encoder 60.

What is claimed is:

1. A robot vehicle comprising:
a robot body having a front end portion and a rear end portion, each of said front end portion and said rear end portion having a left side and a right side;
a pair of front crawlers;
a pair of rear crawlers;
pair of front pivot shafts;
a pair of rear pivot shafts;
each of said front crawlers and each of said rear crawlers having a track frame and a track wherein the track frame has a drive end and a distal end, with the drive end of each front crawler being pivotally mounted by a respective one of the front pivot shafts to a respective of the left and right sides of said front end portion of said robot body such that the distal end of the track frame of the respective front crawler can be pivoted in a circle about the respective one of front pivot shafts to provide a maximum pivoting locus of the respective front crawler, with the drive end of each rear crawler being pivotally mounted by a respective one of the rear pivot shafts to a respective one of the left and right sides of said rear end portion of said robot body such that the distal end of the track frame of the respective rear crawler can be pivoted in a circle about the respective one of the rear pivot shafts to provide a maximum pivoting locus of the respective rear crawler;

the drive end of each of said front crawlers and said rear crawlers having a drive sprocket for driving the track of the respective crawler;

drive means for driving each drive sprocket independently of the other drive sprockets;

the distance between the front pivot shaft of the front crawler and the rear pivot shaft of the rear crawler on each respective side of said robot body being greater than a sum of a radius of the maximum pivoting locus of the respective front crawler and a radius of the maximum pivoting locus of the respective rear crawler so that the maximum pivoting locus of the front crawler located on the right side does not overlap the maximum pivoting locus of the rear crawler located on the right side, and the maximum pivoting locus the front crawler located on the left side does not overlap the maximum pivoting locus of the rear crawler located on the left side;

said robot body having a gravitational center which located at a position between (a) the maximum pivoting loci of the front crawlers and (b) the maximum pivoting loci of the rear crawlers so that the ground contact positions of the front crawlers and the ground contact positions of the rear crawlers are always. outside of the gravitational center of said robot body.

2. A robot vehicle in accordance with claim 1, wherein each pivot shaft is independently rotated by a respective pivoting power transmission system which includes a torque limiter.

3. A robot vehicle in accordance with claim 2, wherein each said pivoting power transmission system further comprises a pivoting angle sensor for detecting a pivoting angle of the respective pivot shaft and providing a pivoting angle signal representative thereof.

4. A robot vehicle in accordance with claim 1, wherein each said track frame has a pivoting power transmission system containing a pivoting motor and a torque limiter, with a respective torque limiter being arranged intermediate of a respective pivoting motor and a respective track frame so that transmission of torque through a pivoting power transmission system is cut off by the respective torque limiter when a pivot reaction force transmitted by the respective track frame exceeds a predetermined value.

5. A robot vehicle in accordance with claim 4, wherein each pivoting power transmission system also contains a sensor for detecting a pivoting angle, the respective sensor being provided in a respective pivoting power transmission system between a respective torque limiter and a respective track frame so that a pivoting angle of the respective track frame can be detected by the sensor even though the pivoting power transmission system is cut by the respective torque limiter.

6. A robot vehicle in accordance with claim 1, further comprising:
an inclination detecting means for detecting a forward inclination angle of said robot body, and
a driving and controlling means adapted for driving and controlling said pivot shafts and said drive sprockets so as to prevent said robot from falling down if said inclination detecting means detects that said robot body is inclined by an angle exceeding a predetermined angle.

7. A robot vehicle in accordance with claim 1, further comprising:
a load detecting means for detecting loads exerted respectively on each of the front crawlers, and
a driving and controlling means adapted for driving and controlling said pivot shafts and said drive sprockets so as to prevent said robot from falling down if said load detecting means detects that a load exerted on one of the front crawlers becomes lower than a predetermined value.

8. A robot vehicle in accordance with claim 7, wherein said driving and controlling means controls the drive means for driving the sprockets in the front crawlers in accordance with a deviation between a desired speed and a present speed, and wherein said load detecting means detects a load exerted on each of said front crawlers in accordance with the value of the deviation between the desired speed and the present speed.

9. A robot vehicle in accordance with claim 7, further comprising:
an inclination detecting means for detecting a forward inclination angle of said robot body, and
wherein said driving and controlling means is also adapted for driving and controlling said pivot shafts and said drive sprockets so as to prevent said robot from falling down if said inclination detecting means detects that said robot body is inclined by an angle exceeding a predetermined angle.

10. A robot vehicle in accordance with claim 9, wherein said driving and controlling means advances said robot in a pivoting posture in which the distal ends of the track frames of said front crawlers are extended in front of said robot body, and then upon the occurrence of at least one of (a) said inclination detecting means detecting that said robot body is inclined by an angle exceeding said predetermined angle, and (b) said load detecting means detecting that a load exerted on one of said front crawlers becomes lower than a predetermined value, pivots the distal ends of the track frames of the front crawlers rearwardly from the front of the robot body by way of a position above the robot body while moving said robot backwardly.

11. A robot vehicle in accordance with claim 9, wherein said driving and controlling means advances at an initial speed said robot in a pivoting posture in which the distal ends of the track frames of the front crawlers are extended in front of said robot body, and then upon the occurrence of at least one of (a) said inclination detecting means detecting that said robot body is inclined by an angle exceeding said predetermined angle, and (b) said load detecting means detecting that a load exerted on one of said front crawlers becomes lower than a predetermined value, pivots the distal ends of the track frames of the front crawlers downwardly so as to take an upright pivoting posture in which the front crawlers stand upright and advances said robot for a predetermined distance at a slower speed in this upright pivoting posture and then retreats said robot rearwardly in this upright pivoting posture, determines during the advancement and the retreat in the upright posture whether a load exerted on the front crawlers exceeds a threshold value, and then, if the thus determined load exceeds said threshold value, advances the robot and, if the thus determined load is below the threshold value, pivots the distal ends of the track frames of the front crawlers rearwardly from the front of the robot body by way of a position above the robot body while moving the robot backwardly.

12. A robot vehicle system comprising a robot vehicle and an operation control system for remotely controlling said robot vehicle, said robot vehicle comprising:

a robot body having a front end portion and a rear end portion, each of said front end portion and said rear end portion having a left side and a right side;
a pair of front crawlers;
a pair of rear crawlers;
a pair of front pivot shafts;
a pair of rear pivot shafts;
each pivot shaft being independently rotated by a respective pivoting power transmission system which includes a pivoting motor, a torque limiter, and a pivoting angle sensor for detecting an actual pivoting angle of respective pivot shaft and providing a feed-back pivoting angle signal representative thereof, each of said pivoting motors being connected through a respective torque limiter and a respective pivot shaft to a respective track frame;
each of said front crawlers and each of said rear crawlers having a track frame and a track wherein the track frame has a drive end and a distal end, with the drive end of each front crawler being pivotally mounted by a respective one of the front pivot shafts to a respective one of the left and right sides of said front end portion of said robot body such that the distal end of the track frame of the respective front crawler can be pivoted in a circle about the respective one of the front pivot shafts to provide a maximum pivoting locus of the respective front crawler, with the drive end of each rear crawler being pivotally mounted by a respective one of the rear pivot shafts to a respective one of the left and right sides of said rear end portion of said robot body such that the distal end of the track frame of the respective rear crawler can be pivoted in a circle about the respective one of the rear pivot shafts to provide a maximum pivoting locus of the respective rear crawler:
the drive end of each of said front crawlers and said rear crawlers having a drive sprocket for driving the track of the respective crawler;
drive means for driving each drive sprocket independently of the other drive sprockets;
the distance between the front pivot shaft of the front crawler and the rear pivot shaft of the rear crawler on each respective side of said robot body being greater than a of a radius of the maximum pivoting locus of the respective front crawler and a radius of the maximum pivoting locus of the respective rear crawler so that the maximum pivoting locus of the front crawler located on the right side does not overlap the maximum pivoting locus of the rear crawler located on the right side, and the maximum pivoting locus of the front crawler located on the left side does not the maximum pivoting locus of the rear crawler located on the left side;
said robot body having a gravitational center which is located at a position between (a) the maximum pivoting loci of the front crawlers and (b) the maximum pivoting loci of the rear crawlers so that the ground contact positions of the front crawlers and of the rear crawlers are always outside of the gravitational center of said robot body;
said operation control system comprising:
a remote operation controller having four rotating angle detectors, each of said rotating angle detectors having a shaft and an associated knob for manipulation by an operator for providing a rotation angle signal for controlling the pivoting posture of a respective one of the track frames, the knobs being arranged three-dimensionally in said remote operation controller similar to the track frames of the crawlers on said robot body so that an operator using the remote operation controller to manually control the robot can directly observe the postures of the four crawlers from the rotating angles of the four knobs; and
a plurality of control circuits for controlling the pivoting of the respective track frames,
wherein each control circuit receives a respective rotation angle signal from the corresponding rotating angle detector as a desired pivoting angle signal, and
wherein each control circuit produces a pivoting drive signal for controlling the pivoting motor of the respective crawler responsive to the difference between the respective desired pivoting angle signal and a feed-back pivoting angle signal from the pivoting angle sensor of the respective pivoting power transmission system.

13. A robot vehicle system in accordance with claim 12, wherein each rotating angle detector is driven by a rotating motor, each rotating motor being bilaterally controlled responsive to a comparison of the respective feed-back pivoting angle signal and the respective rotation angle signal so that an operator using the remote operation controller to manually control the robot vehicle can feel a load condition of the respective crawler in the form of the pivoting resistance of the respective knob effected by the respective rotating motor.

14. A robot vehicle system in accordance with claim 13, wherein said operation control system further comprises an inclination detecting means for detecting a forward inclination angle of said robot body, a load detecting means for detecting loads exerted on each of the front crawlers, and wherein said plurality of control circuits comprises means for controlling each of said drive means and each of said pivoting motors so as to prevent said robot vehicle from falling down upon the occurrence of one of (a) said inclination detecting means detecting that said robot body is inclined by an angle exceeding a predetermined angle and (b) said load detecting means detecting a load exerted on one of the front crawlers becoming less than a predetermined value.

15. A method for operating a robot vehicle comprising:
robot body having a front end portion and a rear end portion, each of said front end portion and said rear end portion having a left side and a right side;
a pair of front crawlers;
a pair of rear crawlers;
a pair of front pivot shafts;
a pair of rear pivot shafts;
each of said front crawlers and each of said rear crawlers having a track frame and a track wherein the track frame has a drive end and a distal end, with the drive end of each front crawler being pivotally mounted by a respective one of the front pivot shafts to a respective one of the left and right sides or said front end portion of said robot body such that the distal end of the track frame of the respective front crawler can be pivoted in a circle about the respective one or the front pivot shafts to provide a maximum pivoting locus of the respective front crawler, with the drive end of each rear crawler being pivotally mounted by a respective one of the rear pivot shafts to a respective one of the left and right sides of said rear end portion of said robot body such that the distal end of the track frame of the respective rear crawler can be pivoted in a circle about the respective one of the rear pivot shafts to provide a maximum pivoting locus of respective rear crawler;

the drive end of each of said front crawlers and said rear crawlers having a drive sprocket for driving the track of the respective crawler;

drive means for driving each drive sprocket independently of the other drive sprockets;

the distance between the front pivot shaft of the front crawler and the rear pivot shaft of the rear crawler on each respective side of said robot body being greater than a sum of a radius of the maximum pivoting locus of the respective front crawler and a radius of the maximum pivoting locus of the respective rear crawler so that the maximum pivoting locus of the front crawler located on the right side does not overlap the maximum pivoting locus of the rear crawler located on the right side, and the maximum pivoting locus of the front crawler located on the left side does not overlap the maximum pivoting locus of the rear crawler located on the left side; and said robot body having a gravitational center which is located at a position between (a) the maximum pivoting loci of the front crawlers and (b) the maximum pivoting loci of the rear crawlers so that the ground contact positions of the front crawlers and of the rear crawlers are always outside of the gravitational center of said robot body;

said method comprising:
  driving at least two of said drive sprockets to cause said robot vehicle to travel;
  detecting a forward inclination angle of said robot body;
  comparing the thus detected inclination angle with a predetermined angle and providing a first control signal when the thus detected inclination angle becomes greater than said predetermined angle;
  detecting the load exerted on the front left crawler;
  comparing the thus detected load on the front left crawler with a predetermined load value and providing a second control signal when the load on the front left crawler becomes less than said predetermined load value;
  detecting the load exerted on the front right crawler;
  comparing the thus detected load on the front right crawler with the predetermined load value and providing a third control signal when the load on the front right crawler becomes less than said predetermined load value;
  controlling said drive sprockets and said pivot shafts responsive to said control signals.

16. A method in accordance with claim 15, wherein said step of controlling comprises advancing said robot vehicle in a pivoting posture in which the distal ends of the track frames of the front crawlers are extended in front of said robot body; and
  then pivoting the distal ends of the track frames of the front crawlers rearwardly from the front of the robot body by way of a position above the robot body while causing the robot vehicle to move backwardly upon the occurrence of at least one of said control signals.

17. A method in accordance with claim 15, wherein said step of controlling comprises advancing said robot vehicle in a surveying posture in which the distal ends of the track frames of the front crawlers are extended in front of said robot body;
  stopping the traveling of the robot vehicle and pivoting the distal ends of the track frames of the front crawlers downwardly toward their lowermost positions upon the occurrence of at least one of said second and third control signals while the thus detected inclination angle is less than said predetermined angle;
  then causing said robot vehicle to advance a predetermined distance at a slow speed and then retreat a predetermined distance at a slow speed for a plurality of times;
  determining during such advancing and retreating whether the load exerted on each of the front crawlers exceeds said predetermined load value;
  then causing the robot vehicle to travel forwardly with the distal ends of the track frames of the front crawlers extending downwardly toward their lowermost positions upon a determination during such advancing and retreating that the load exerted on each of the front crawlers exceeds said predetermined load value; and
  pivoting the distal ends of the track frames of the front crawlers rearwardly from the front of the robot body by way of a position above the robot body while causing the robot vehicle to move backwardly upon the occurrence of a determination during such advancing and retreating that the load exerted on at least one of the front crawlers is less than said predetermined load value.

18. A method in accordance with claim 15, wherein the sprockets in said front crawlers are controlled by a drive instruction in accordance with a deviation between a desired speed and a present speed, and wherein each of the step of detecting the load exerted on the front right crawler and the step of detecting the load exerted on the front left crawler comprises detecting a load exerted on the respective front crawler in accordance with the value of the deviation between the desired speed and the present speed.

19. A method in accordance with claim 15 further comprising:
  establishing a remote control signal representative of the desired pivoting angle for one of the track frames;
  establishing a feed-back signal representative of the present pivoting angle for said one of the track frames;
  comparing said remote control signal with said feed-back signal; and
  rotating the respective pivot shaft responsive to the comparison of said remote control signal with said feed-back signal.

20. A method in accordance with claim 19, wherein each remote control signal is established by a respective rotating angle detector which is driven by a rotating motor, further comprising:

controlling the respective rotating motor responsive to a comparison of the respective remote control signal with the respective feed-back signal.

21. A remote operation controller for a robot having a robot body with a front end portion and a rear end portion and a left side and a right side, a front pair of crawlers pivotally mounted to the left side and right side of the front end portion of the robot body, and a rear pair of crawlers pivotally mounted to the left side and right side of the rear end portion of the robot body, each crawler having a drive sprocket and a drive motor for driving a respective crawler independently from the other crawlers, each crawler having a pivoting motor for pivoting the respective crawler with respect to the robot body, each pivoting motor having a pivoting angle detector associated therewith for producing a feedback signal representing an actual pivoting position of the respective crawler;

said remote operation controller comprising:

four rotating angle detectors, each of said rotating angle detectors having a shaft, each of said rotating angle detectors being adapted to produce a rotating angle signal to control the posture of the track frame of a respective one of the crawlers, four knobs for manipulation by an operator, each of said knobs being positioned on the shaft of a respective one of said rotating angle detectors, said four knobs being arranged three-dimensionally in said remote operation controller in a manner similar to the mounting of the crawlers on the robot body, and a first control circuit which receives a rotating angle signal from a respective one of said rotating angle detectors as a desired pivoting angle signal for the respective crawler, and which receives a feedback signal representing an actual pivoting position of the respective crawler, and which produces a pivoting drive signal for controlling the pivoting motor of the respective crawler, the respective pivoting drive signal being responsive to a difference between the respective desired pivoting angle signal and the feed-back signal representing the actual pivoting position of the respective crawler.

22. A remote operation controller in accordance with claim 21, further comprising four controller motors incorporated in said controller, each of said controller motors being associated with and driving a respective one of said four rotating angle detectors, each of said controller motors being bilaterally controlled by a second control circuit in response to a difference between the respective desired pivoting angle signal and the feed-back signal representing the actual pivoting position of the respective crawler so that an operator using the remote operation controller to manually control the robot can directly observe the postures of the four crawlers from the rotating angles of the four knobs, and so that the operator can feel a load condition of the respective crawler in the form of the pivoting resistance of the respective knob effected by the respective controller motor.

* * * * *

UNITED STATES PATENT AND TRADEMARK OFFICE
CERTIFICATE OF CORRECTION

PATENT NO. : 5,337,846

DATED : August 16, 1994

INVENTOR(S) : Koji OGAKI et al

It is certified that error appears in the above-indentified patent and that said Letters Patent is hereby corrected as shown below:

Column 7, line 61, after "extend" insert --from its--.

Column 7, line 68, after "the gear" insert --32--.

Column 13, line 54, delete "81" and insert --$\theta$1--.

Column 13, line 57, delete "82" and insert --$\theta$2--.

Column 13, line 59, delete "82" and insert --$\theta$2--.

Column 15, line 45, delete "value TO" and insert --value T0--.

Column 17, line 27, delete "12a" and insert --12f--.

Column 17, line 31, delete "angles e" and insert --angles $\theta$--.

Column 18, line 54, before "pair", insert --a--.

Column 18, line 61, after "respective" insert --one--.

Column 18, line 65, after "of" insert --the--.

Column 19, line 23, after "locus", insert --of--.

Column 19, line 27, after "which", insert --is--.

Column 19, line 34, delete "always." and insert --always--.

Column 20, line 3, after "robot", insert --vehicle--.

UNITED STATES PATENT AND TRADEMARK OFFICE
CERTIFICATE OF CORRECTION

PATENT NO. : 5,337,846

DATED : August 16, 1994

INVENTOR(S) : Koji OGAKI et al

Page 2 of 3

It is certified that error appears in the above-indentified patent and that said Letters Patent is hereby corrected as shown below:

```
Column 20, line 13, after "robot", insert --vehicle--.

Column 20, line 32, after "robot", insert --vehicle--.

Column 20, line 37, after "robot", insert --vehicle--.

Column 20, line 48, after "robot", insert --vehicle--.

Column 20, line 51, after "robot", insert --vehicle--.

Column 20, line 62, after "robot", insert --vehicle--.

Column 20, line 64, after "robot", insert --vehicle--.

Column 21, line 1, after "robot", insert --vehicle--.

Column 21, line 6, after "robot", insert --vehicle--.

Column 21, line 22, after "of", insert --the--.

Column 21, line 55, after "than a", insert --sum--.

Column 21, line 63, after "not", insert --overlap--.

Column 22, line 15, after "robot", insert --vehicle--.

Column 22, line 59, before "robot", insert --a--.

Column 23, line 7, delete "or" and insert --of--.
```

UNITED STATES PATENT AND TRADEMARK OFFICE
CERTIFICATE OF CORRECTION

PATENT NO. : 5,337,846
DATED : August 16, 1994
INVENTOR(S) : Koji OGAKI et al

It is certified that error appears in the above-indentified patent and that said Letters Patent is hereby corrected as shown below:

Column 23, line 17, before "respective", insert --the--.

Column 23, line 66, after "value;", insert --and--.

Column 25, line 8, after "robot", insert --vehicle--.

Column 26, line 27, after "robot", insert --vehicle--.

Signed and Sealed this

Seventh Day of March, 1995

Attest:

BRUCE LEHMAN

Attesting Officer     Commissioner of Patents and Trademarks